US011276366B2

United States Patent
Kim et al.

(10) Patent No.: US 11,276,366 B2
(45) Date of Patent: Mar. 15, 2022

(54) SYSTEM INCLUDING A PLURALITY OF DISPLAY APPARATUS AND CONTROL METHOD THEREOF

(71) Applicant: SAMSUNG ELECTRONICS CO., LTD., Suwon-si (KR)

(72) Inventors: Hyunseok Kim, Suwon-si (KR); Junghyuk Kim, Suwon-si (KR); Daegun Kim, Suwon-si (KR); Sujin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/256,801

(22) PCT Filed: Jul. 17, 2019

(86) PCT No.: PCT/KR2019/008819
§ 371 (c)(1),
(2) Date: Dec. 29, 2020

(87) PCT Pub. No.: WO2020/017882
PCT Pub. Date: Jan. 23, 2020

(65) Prior Publication Data
US 2021/0375231 A1    Dec. 2, 2021

(30) Foreign Application Priority Data

Jul. 20, 2018   (KR) .................. 10-2018-0084754

(51) Int. Cl.
*G09G 5/00* (2006.01)
*G06F 3/14* (2006.01)

(52) U.S. Cl.
CPC ......... *G09G 5/006* (2013.01); *G06F 3/1446* (2013.01); *G09G 2300/026* (2013.01); *G09G 2370/06* (2013.01)

(58) Field of Classification Search
CPC ............ G09G 5/006; G09G 2300/026; G09G 2370/06; G09G 2370/047; G06F 3/1446
See application file for complete search history.

(56) References Cited

U.S. PATENT DOCUMENTS

| 2013/0091529 A1* | 4/2013 | Hasegawa ............... H04N 5/76 725/105 |
| 2015/0286456 A1 | 10/2015 | Griffin et al. |
| 2017/0329568 A1 | 11/2017 | Jo |

FOREIGN PATENT DOCUMENTS

| CN | 202068434 U | 12/2011 |
| JP | 2017-207580 A | 11/2017 |

(Continued)

OTHER PUBLICATIONS

Communication dated Nov. 13, 2019 issued by the International Searching Authority in counterpart Application No. PCT/KR2019/008819 (PCT/ISA/210).

*Primary Examiner* — Abbas I Abdulselam
(74) *Attorney, Agent, or Firm* — Sughrue Mion, PLLC

(57) ABSTRACT

Disclosed is each display apparatus interconnected in series based on a DisplayPort standard. Each of the display apparatus includes a processor configured to request a front-stage display apparatus to confirm whether a first image signal is normally transmitted during an operation for displaying an image based on the first image signal of a first source device received from the front-stage display apparatus, control to display the image based on the first image signal received from the front-stage display apparatus in response to receiving a confirmation signal confirming whether the first image signal is normally transmitted from the front-stage display apparatus, and control to receive a second image signal of a second source device from a rear-stage display apparatus in response to not receiving the confirmation signal from the front-stage display apparatus.

14 Claims, 16 Drawing Sheets

(56) References Cited

FOREIGN PATENT DOCUMENTS

| KR | 10-1548351 B1 | 8/2015 |
| KR | 10-2018-0068470 A | 6/2018 |
| KR | 10-2019-0048424 A | 5/2019 |

* cited by examiner

SYSTEM INCLUDING A PLURALITY OF DISPLAY APPARATUS AND CONTROL METHOD THEREOF

BACKGROUND

1. Field

The disclosure relates to a system including a plurality of display apparatuses interconnected to display images together based on a content signal provided from a content source, and a control method thereof, and more particularly, to a system including a plurality of display apparatuses having a structure capable of normally displaying images in each display apparatus in response to errors relating to transmission and reception of a content signal from a content source within the system, and a control method thereof.

2. Discussion of Related Art

In order to compute and process predetermined information according to a specific process, an electronic apparatus basically including electronic components such as a CPU, a chipset, and a memory for computation may be classified into various types depending on what information is to be processed or what its purpose is. For example, the electronic apparatus includes an information processing apparatus such as a PC or a server that processes general-purpose information, an image processing apparatus that processes image data, an audio apparatus that processes audio, a household appliance that performs household chores, and the like. The image processing apparatus may be implemented as a display apparatus that displays the processed image data as an image on a display panel included in the image processing apparatus. Examples implemented as a single display apparatus include TVs, monitors, portable multimedia players, tablets, mobile phones, and the like, and examples implemented by a plurality of display apparatuses include a video wall. The video wall is a system in which a plurality of display apparatuses arranged in a matrix form implements a large screen environment.

There are several methods of transmitting a content signal from a content source to each display apparatus, and as one of the methods, there is a loop-out method. The loop-out method is a type of serial connection method in which a content signal output from a content source is input to a first display apparatus, the content signal is branched within the first display apparatus, and the branched content signal is input from the first display apparatus to a second display apparatus. This input/output type applies to all the display apparatuses in the system.

There may be various reasons why images are not normally displayed in the system connected by the loop-out method. For example, disconnection or poor connection may occur at a predetermined point connecting each display apparatus from the content source. In this case, since the display apparatus that is disposed upstream from or before the predetermined point receives the content signal without any problem, the image may be displayed normally, whereas since the display apparatus that is disposed downstream from or after the predetermined point is hard to receive the content signal normally, the image may not be displayed normally. Obviously, the problem can be solved if a user checks the point and takes appropriate actions such as replacing cables, making a connection between terminals normal, or replacing the display apparatuses, which causes inconvenience in that the user has to take actions directly.

Accordingly, each display apparatus connected in the loop-out method is required to operate to display an image based on a content signal normally when it is identified that a content signal is not normally received from one content source.

SUMMARY

According to an embodiment of the disclosure, a display system includes: a plurality of display apparatuses configured to be interconnected in series based on a DisplayPort standard and display an image based on an image signal from a first source device or a second source device, in which the display apparatus includes: a display; a signal input/output interface configured to be connected to a front-stage display apparatus and a rear-stage display apparatus, respectively; and a processor configured to request the front-stage display apparatus to confirm whether a first image signal is normally transmitted during an operation for displaying an image based on the first image signal of the first source device received from the front-stage display apparatus, control to display the image based on the first image signal received from the front-stage display apparatus on the display in response to receiving a confirmation signal confirming whether the first image signal is normally transmitted from the front-stage display apparatus, and control the signal input/output interface to receive a second image signal of the second source device from the rear-stage display apparatus in response to not receiving the confirmation signal from the front-stage display apparatus.

The signal input/output interface may include a first port connected to the front-stage display apparatus and a second port connected to the rear-stage display apparatus, and the processor may control to output the first image signal through the second port while the first image signal is received through the first port, and output the second image signal through the first port while the second image signal is received through the second port in response to not receiving the confirmation signal.

The first image signal and the second image signal may include the same content.

The signal input/output interface may include a first port connected to the front-stage display apparatus and a second port connected to the rear-stage display apparatus, and the first port may include a first channel that is provided to receive the first image signal and a second channel that is provided to receive the confirmation signal from the front-stage display apparatus and is different from the first channel.

The first port may further include a third channel that is different from the first channel and the second channel, and the processor may request the front-stage display apparatus to confirm whether the first image signal is normally transmitted by generating an interrupt to the front-stage display apparatus through the third channel.

The processor may request the front-stage display apparatus to confirm whether the first image signal is normally transmitted when a preset error is detected in the reception operation of the first image signal through the first channel.

The processor may determine that the preset error is detected when the first image signal is not received through the first channel for a preset time or a packet error is detected in the first image signal received through the first channel.

According to another embodiment of the disclosure, a control method of a display system including a plurality of display apparatuses that are interconnected in series based on a DisplayPort standard and display an image based on an image signal of a first source device or a second source device includes: controlling, by the display apparatus, to request the front-stage display apparatus to confirm whether a first image signal is normally transmitted during an operation for displaying an image based on the first image signal of the first source device received from the front-stage display apparatus; controlling, by the display apparatus, to display the image based on the first image signal received from the front-stage display apparatus in response to receiving a confirmation signal confirming whether the first image signal is normally transmitted from the front-stage display apparatus; and controlling, by the display apparatus, to receive a second image signal of the second source device from a rear-stage display apparatus in response to not receiving the confirmation signal from the front-stage display apparatus.

The display apparatus may include a first port connected to the front-stage display apparatus, and a second port connected to the rear-stage display apparatus, and control to output the first image signal through the second port while the first image signal is received through the first port, and output the second image signal through the first port while the second image signal is received through the second port in response to not receiving the confirmation signal.

The first image signal and the second image signal may include the same content.

The display apparatus may include a first port connected to the front-stage display apparatus, and a second port connected to the rear-stage display apparatus, and the first port may include a first channel that is provided to receive the first image signal and a second channel that is provided to receive the confirmation signal from the front-stage display apparatus and is different from the first channel.

The first port may further include a third channel that is different from the first channel and the second channel, and an interrupt may be generated to the front-stage display apparatus through the third channel to request the front-stage display apparatus to confirm whether the first image signal is normally transmitted.

The front-stage display apparatus may be requested to confirm whether the first image signal is normally transmitted when a preset error is detected in the reception operation of the first image signal through the first channel.

It may be determined that the preset error is detected when the first image signal is not received through the first channel for a preset time or a packet error is detected in the first image signal received through the first channel.

According to still another embodiment of the disclosure, a display apparatus includes: a display; a signal input/output interface configured to be connected to a front-stage display apparatus and a rear-stage display apparatus, respectively, among a plurality of display apparatuses interconnected in series based on a DisplayPort standard; and a processor configured to request the front-stage display apparatus to confirm whether a first image signal is normally transmitted during an operation for displaying an image based on the first image signal of a first source device received from the front-stage display apparatus, control to display the image based on the first image signal received from the front-stage display apparatus on the display in response to receiving a confirmation signal confirming whether the first image signal is normally transmitted from the front-stage display apparatus, and control the signal input/output interface to receive a second image signal of a second source device from the rear-stage display apparatus in response to not receiving the confirmation signal from the front-stage display apparatus.

The signal input/output interface may include a first port connected to the front-stage display apparatus and a second port connected to the rear-stage display apparatus, and the processor may control to output the first image signal through the second port while the first image signal is received through the first port, and output the second image signal through the first port while the second image signal is received through the second port in response to not receiving the confirmation signal.

The first image signal and the second image signal may include the same content.

The signal input/output interface may include a first port connected to the front-stage display apparatus and a second port connected to the rear-stage display apparatus, and the first port may include a first channel that is provided to receive the first image signal and a second channel that is provided to receive the confirmation signal from the front-stage display apparatus and is different from the first channel.

The first port may further include a third channel that is different from the first channel and the second channel, and the processor may request the front-stage display apparatus to confirm whether the first image signal is normally transmitted by generating an interrupt to the front-stage display apparatus through the third channel.

The processor may request the front-stage display apparatus to confirm whether the first image signal is normally transmitted when a preset error is detected in the reception operation of the first image signal through the first channel.

DETAILED DESCRIPTION

Hereinafter, embodiments according to the disclosure will be described in detail with reference to the accompanying drawings. Embodiments described with reference to each drawing are not mutually exclusive configurations unless otherwise specified, and a plurality of embodiments may be selectively combined and implemented in one apparatus. The combination of the plurality of embodiments may be arbitrarily selected and applied by a person skilled in the art of the disclosure in implementing the spirit of the disclosure.

If there are terms including an ordinal number such as a first component, a second component, and the like in embodiments, these terms are used to describe various components, and the terms are used to distinguish one component from other components, and therefore meaning of these components are not limited by these terms. Terms used in the embodiments are applied to describe the embodiments, and do not limit the spirit of the disclosure.

In addition, in the case where the expression "at least one" among a plurality of components is described in the present specification, this expression refers to not only the whole of a plurality of components, but each one excluding the rest of the plurality of components or all combinations of thereof.

Figure 1:
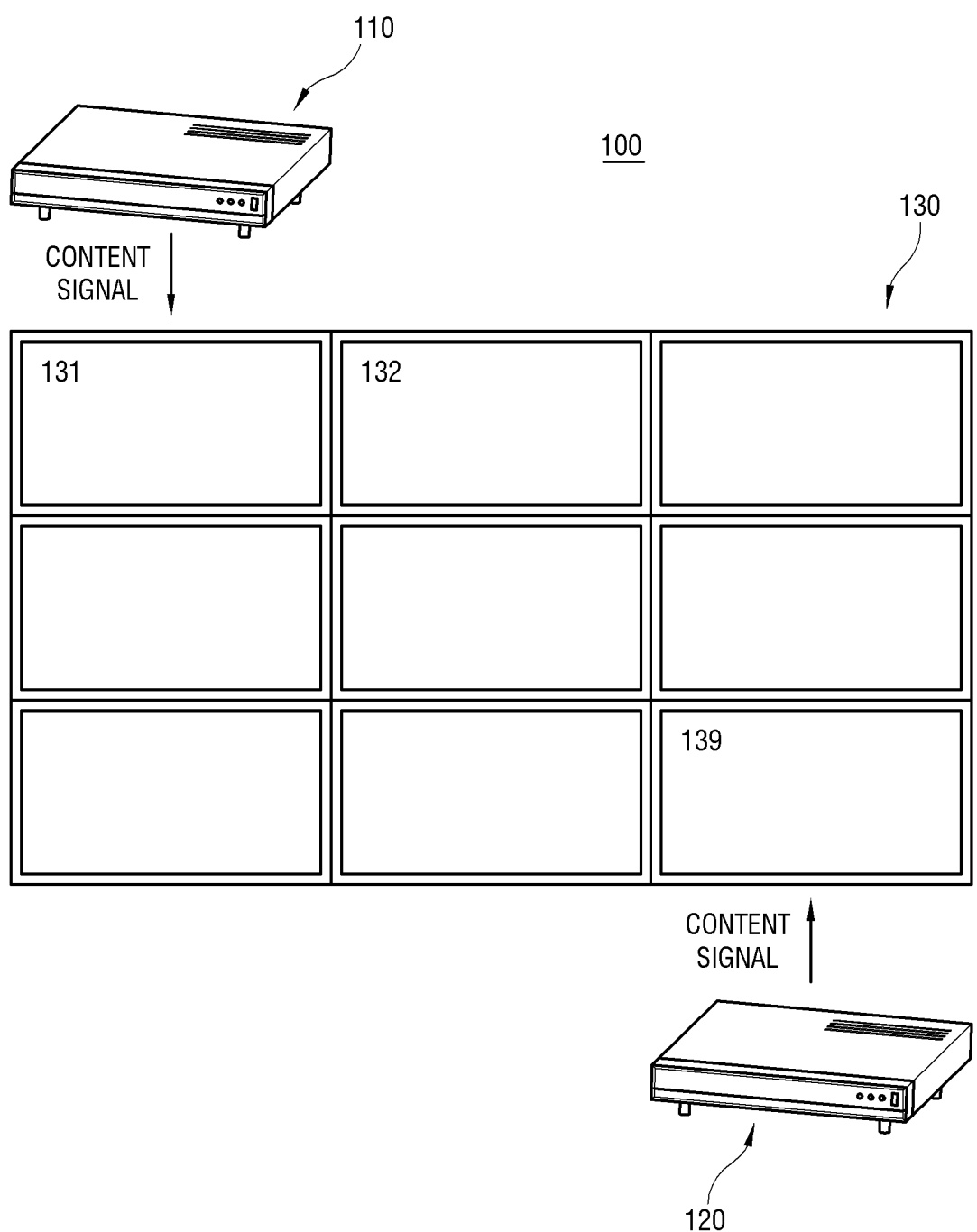
FIG. 1 is an exemplary diagram of a video wall system according to an embodiment of the disclosure.

FIG. 1 is an exemplary diagram of a video wall system according to an embodiment of the disclosure.

As illustrated in FIG. 1, a system 100 according to the present embodiment includes a plurality of display apparatuses 130. The plurality of display apparatuses 130 are arranged in a matrix form in parallel to form a video wall system forming a large screen. For example, digital signage installed in an open place, such as outdoors, should allow many people to easily recognize displayed content on a screen even from a long distance. To this end, the digital signage needs to have a large screen. However, since a single screen size of a typical display apparatus 130 is limited in manufacturing, a large number of display apparatuses 130 may be combined to form a video wall, thereby realizing a large-screen digital signage.

Each display apparatus 130 of the system 100 receives content signals provided from at least one of content sources 110 and 120, and processes and displays the received content signals individually. For example, each display apparatus 130 selects and displays only a location in the system 100 or an area corresponding to its own ID in the system 100 from the entire area of an image frame of the content signal. That is, the plurality of display apparatuses 130 share and display a partial region of the corresponding image frames, so the system 100 generally displays the entire area of the image frame.

In this embodiment, the system 100 implemented as a video wall is taken as an example, but the plurality of display apparatuses 130 do not necessarily need to be arranged in a matrix form, and may be arranged in a form other than a matrix depending on the design method.

Various methods are possible for the content sources 110 and 120 to provide the content signals to the plurality of display apparatuses 130, but a loop-out method is applied in this embodiment. For example, when a content signal is transmitted from the first content source 110 to a first display apparatus 131 of the plurality of display apparatuses 130, the content signal branches in the first display apparatus 131, and one of the branched content signals is transmitted to a processor of the first display apparatus and the other is transmitted to the second display apparatus 132. As a transmission structure of content signals between devices, both cable and wireless communication can be employed. A signal transmission type in which the plurality of display apparatuses 130 are connected in series and in which the content signals are sequentially transmitted from the content sources 110 and 120 to each display apparatus 130 is referred to as a loop-out type for convenience Here, the plurality of display apparatuses 130 connected in the loop-out type may be identified by being assigned an order based on the first content source 110 for convenience. For example, the first display apparatus 131 is directly connected to the first content source 110, and the second display apparatus 132 is directly connected to the first display apparatus 131. Here, the direct connection means a case in which, for example, two devices are interconnected through a cable to exchange signals.

When viewed based on the first content source 110, the first display apparatus 131 has a loop-out connection order that precedes the second display apparatus 132. Likewise, if the display apparatuses 130 are all 9 units, the apparatus having the last loop-out connection order may be referred to as a ninth display apparatus 139. In addition, this loop-out connection order is also the order in which the content signal output from the first content source 110 is transmitted. In addition, as a method for classifying a plurality of display apparatuses 130, various methods such as assigning individual IDs to each display apparatus 130 may be applied.

The content sources 110 and 120 in this embodiment include a first content source 110 and a second content source 120. The first content source 110 and the second content source 120 are the same in that a predetermined content signal is provided to the plurality of display apparatuses 130. However, the first content source 110 and the second content source 120 are different in that they are each connected to the display apparatuses 131 and 139 at both ends of the loop-out order. That is, the first content source 110 is directly connected to the first display apparatus 131, whereas the second content source 120 is directly connected to the last display apparatus 139.

The content signal output from the first content source 110 may be the same as or different from the content signal output from the second content source 120.

When the first content source 110 and the second content source 120 output the same content signal, the system 100 displays the image based on the content signal output from the first content source 110 on the plurality of display apparatuses 130. When it is determined that the content signal output from the first content source 110 is not normally transmitted to each display apparatus 130, the system 100 causes the image based on the content signal output from the second content source 120 to be displayed on the plurality of display apparatuses 130.

Alternatively, when the first content source 110 and the second content source 120 output different content signals, the system 100 first causes the image based on the content signal output from the first content source 110 to be displayed on the plurality of display apparatuses 130. When the reproduction of the content signal output from the first content source 110 is terminated, the system 100 causes the image based on the content signal output from the second content source 120 to be displayed on the plurality of display apparatuses 130.

A configuration in which the system 100 selectively switches from the first content source 110 to the second content source 120 according to the transmission state of the content signal output from the first content source 110 will be described below in more detail. Here, the determination operation and the switching operation may be performed by each display apparatus 130.

Hereinafter, a signal transmission structure between a plurality of display apparatuses 130 connected through a loop-out will be described in more detail.

Figure 2:
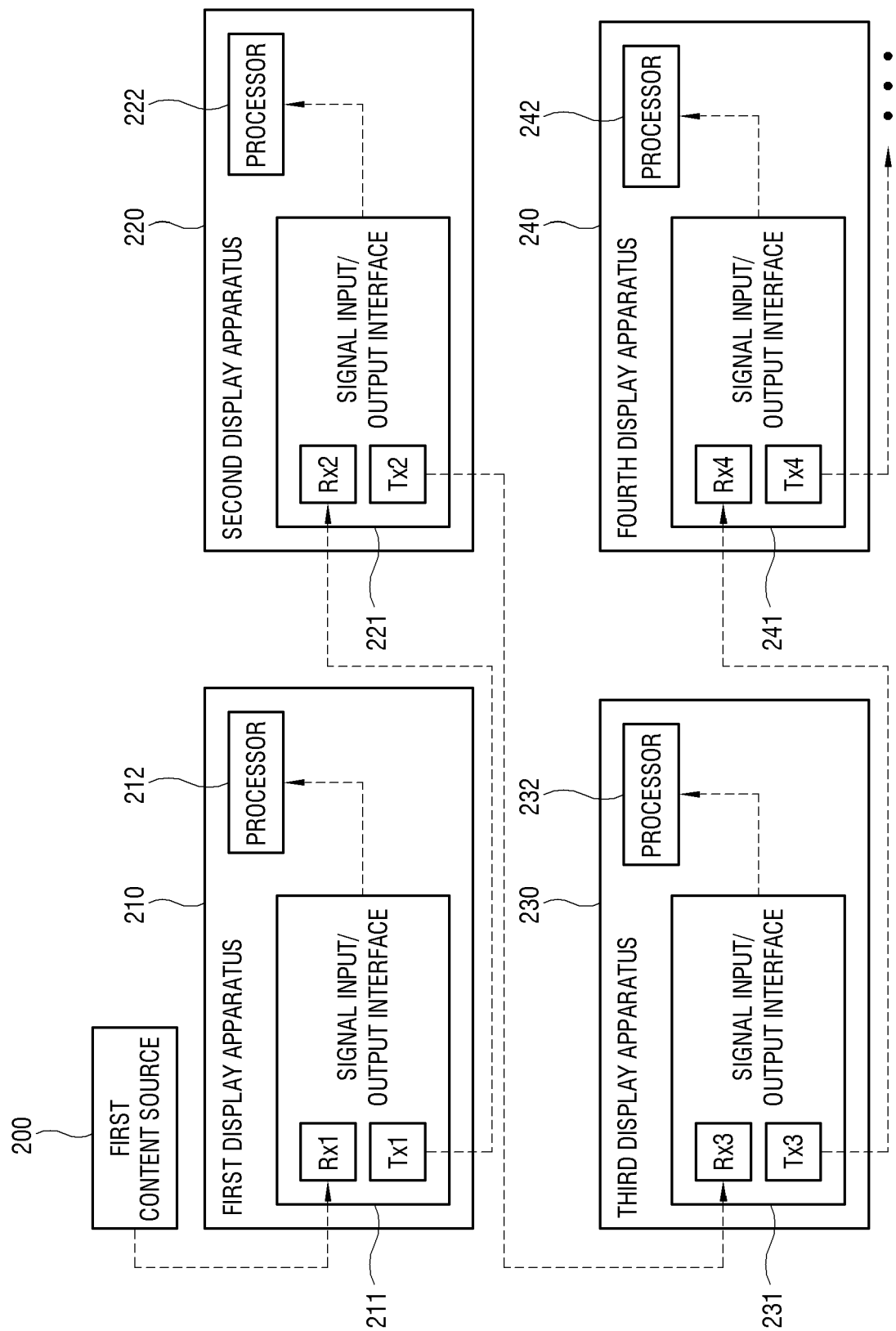
FIG. 2 is a configuration block diagram illustrating a signal transmission relationship between a plurality of display apparatuses in the system according to an embodiment of the disclosure.

FIG. 2 is a configuration block diagram illustrating a signal transmission relationship between a plurality of display apparatuses in a system according to an embodiment of the disclosure.

As illustrated in FIG. 2, a plurality of display apparatuses 210, 220, 230, and 240 are connected by loop-out. In FIG. 2, the first four display apparatuses 210, 220, 230, and 240 are connected by loop-out according to the loop-out order from the first content source 200, but a larger number of display apparatuses 210, 220, 230, 240) may be connected to each other in succession according to the method described in this embodiment.

The plurality of display apparatuses 210, 220, 230, and 240 include a first display apparatus 210, a second display apparatus 220, a third display apparatus 230, and a fourth display apparatus 240 that are sequentially connected. In the following embodiment, the case in which the connection between the devices is connected by a cable according to the DisplayPort (DP) standard is described, but the connection method and standard are not limited.

The plurality of display apparatuses 210, 220, 230, and 240 each include signal input/output interfaces 211, 221, 231, and 241 through which signals are input and output, and processors 212, 222, 232, and 242 that process signals. In addition, each signal input/output interface 211, 221, 231, and 241 has reception ports Rx1, Rx2, Rx3, and Rx4 to which signals are input, and transmission ports Tx1, Tx2, Tx3, and Tx4 through which signals are output. Each of the display apparatuses 210, 220, 230, and 240 may have the same model or specific hardware details, or may have different models or specific hardware details from each other, but basically have the following hardware structure.

The method of transmitting a content signal is as follows. The first content source 200 outputs a content signal to Rx1 of the signal input/output interface 211 of the first display apparatus 210. The signal input/output interface 211 of the first display apparatus 210 transmits the content signal to the processor 212 of the first display apparatus 210 and outputs the content signal to the second display apparatus 220 through Tx1. The second display apparatus 220 transmits and processes the content signal received by Rx2 according to the same principle as the first display apparatus 210. According to this method, the content signal from the first content source 200 is transmitted to all the display apparatuses 210, 220, 230, and 240.

In this embodiment, the terms "reception ports Rx1, Rx2, Rx3, and Rx4 and transmission ports Tx1, Tx2, Tx3, and Tx4" are classified for convenience according to their role when the content signal is transmitted from the first content source 200, and therefore, the terms "reception" and "transmission" do not limit the functionality of the ports. When the content signal is not normally transmitted from the first content source 200, the reception ports Rx1, Rx2, Rx3, and Rx4 and the transmission ports Tx1, Tx2, Tx3, and Tx4 may perform the reception and transmission operations of the content signal differently from the present embodiment. A detailed description thereof will be provided below.

On the other hand, when each of the signal input/output interfaces 211, 221, 231, and 241 is connected by the DP standard, each of the signal input/output interfaces 211, 221, 231, and 241 is connected through a main link, an auxiliary channel, and hot plug detection (HPD) signal line. The main link is a uni-directional, high-band, and low-latency channel used to transmit content signals such as uncompressed video and audio. The AUX channel is a half-duplex bidirectional channel used for link management and device control. The HPD signal through the HPD signal line operates as an interrupt request by the sink device among the interconnected source devices and sink devices.

Hereinafter, a hardware configuration of any one of the display apparatuses 210, 220, 230, and 240 will be described.

Figure 3:
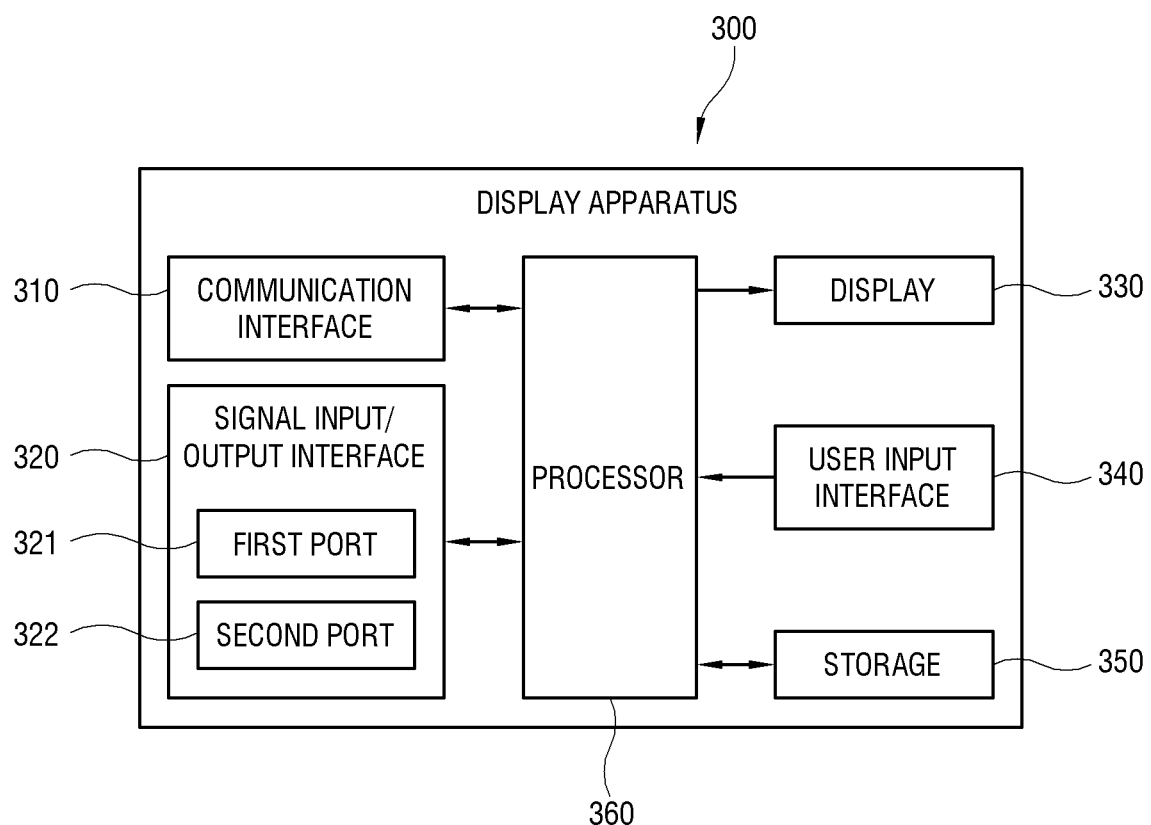
FIG. 3 is a configuration block diagram of the display apparatus of the system according to an embodiment of the disclosure.

FIG. 3 is a configuration block diagram of a display apparatus of the system according to the embodiment of the disclosure.

As illustrated in FIG. 3, a display apparatus 300 includes a communication interface 310 that communicates with an external apparatus, a signal input/output interface 320 that is provided to input/output predetermined data such as a content signal, a display 330 that displays an image, a user input interface 340 that performs user input, a storage 150 in which data is stored, and a processor 360 that processes data.

The communication interface 310 is a two-way communication circuit that includes at least one of components such as communication modules and communication chips corresponding to various types of wired and wireless communication protocols. For example, the communication interface 310 may be implemented by a wireless communication module for performing wireless communication with an AP according to a Wi-Fi method, a LAN card wired to a router or a gateway, and the like.

The signal input/output interface 320 is wired to a predetermined external apparatus in a one-to-one or one-to-many manner, thereby receiving or outputting data from or to the corresponding external apparatus. The signal input/output interface 320 of this embodiment includes a plurality of connectors or ports according to the DP standard. According to this embodiment, the signal input/output interface 320 may be connected to other display apparatuses or content sources. The signal input/output interface 320 includes, for example, a first port 321 connected to a front-stage display apparatus and a second port 322 connected to a rear-stage display apparatus.

The display 330 includes a display panel that may display an image on a screen. The display panel is provided as a light-receiving structure such as a liquid crystal type or a self-luminous structure such as an OLED type. The display 330 may further include additional components according to the structure of the display panel. For example, if the display panel is a liquid crystal type, the display further includes a backlight unit that supplies light to a liquid crystal display panel, a panel driving substrate that drives a liquid crystal of the liquid crystal display panel, and the like.

The user input interface 340 includes various types of input interfaces provided to perform user input. The user input interface 340 may be configured in various forms according to the type of the electronic apparatus 300, and includes, for example, a mechanical or electronic button of the electronic apparatus 300, a remote controller separate from the electronic apparatus 300, a touch pad, a touch installed on the display 330, and the like.

The storage 350 is accessed by the processor 360, and operations such as reading, writing, modifying, deleting, and updating data are performed according to the control of the processor 360. The storage 350 includes a nonvolatile memory such as a flash memory, a hard-disc drive, and a solid-state drive (SSD) that may store data regardless of whether or not power is supplied, and a volatile memory such as such as a buffer and a RAM into which data for processing is loaded.

The processor 360 includes one or more hardware processors implemented as a CPU, a chipset, a circuit, and the like that are mounted on a printed circuit board, and may be implemented as a system on chip (SOC) depending on the design method. The processor 360 includes modules corresponding to various processes such as a demultiplexer, a decoder, a scaler, an audio DSP, and an amplifier, in which some or all of them may be implemented as an SOC. For example, a module related to image processing such as a demultiplexer, a decoder, and a scaler may be implemented as an image processing SOC, and an audio DSP may be implemented as a separate chipset from the SOC.

The processor 360 becomes a hardware subject that performs the overall operation of the display apparatus 300. That is, the processor 360 executes a preset instruction stored in the storage 350 to perform the operation of the display apparatus 300. In terms of software, a predetermined operation of the display apparatus 300 is performed by an operating system or a kernel or is performed by an application executed on the kernel, and the processor 360 performs operation, processing, and control of data so that the software is executed. For example, the processor 360 executes the operating system or the kernel of the display apparatus 300, and also executes an application or a program on the kernel to perform the process.

Under this structure, the display apparatus 300 processes the first content signal to be displayed as an image while the first content signal is normally received from the front-stage display apparatus through the first port 321, and outputs the first content signal to the rear-stage display apparatus through the second port 322.

However, when it is determined that the first content signal is not normally received through the first port 321, the display apparatus 300 receives and processes the second content signal through the second port 322 and outputs the second content signal to the first port 321, so the roles of the first port 321 and the second port 322 are switched to each other. Accordingly, when it is difficult for the first content source to normally provide the first content signal to all of the plurality of display apparatuses, an image can be displayed on each display apparatus without the user performing manual action.

Hereinafter, these embodiments will be described in more detail.

Figure 4:
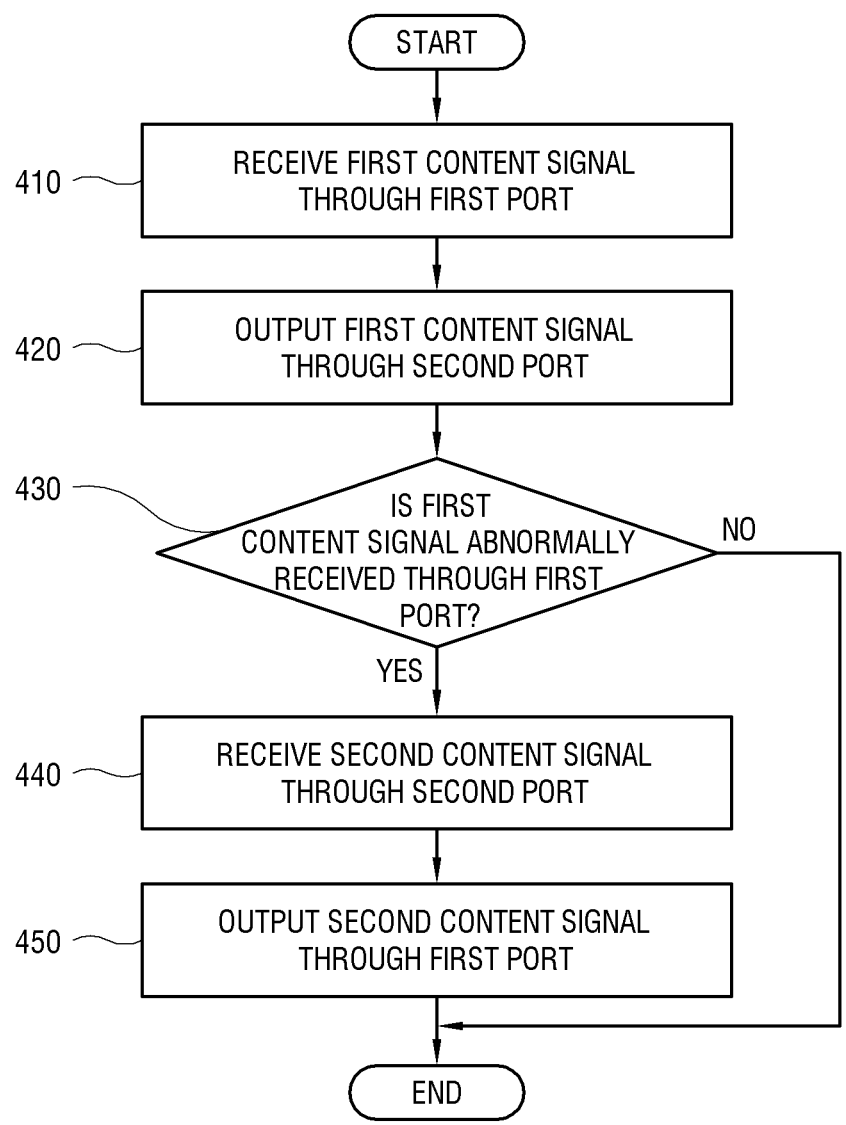
FIG. 4 is a flowchart illustrating a control method of a display apparatus according to an embodiment of the disclosure.

FIG. 4 is a flowchart illustrating a control method of a display apparatus according to an embodiment of the disclosure.

As illustrated in FIG. 4, the following operation is performed by the processor of the display apparatus.

In step 410, the display apparatus receives the first content signal through the first port.

In step 420, the display apparatus processes the received first content signal, and outputs the first content signal through the second port.

In step 430, the display apparatus determines whether the reception of the first content signal through the first port is abnormal.

When it is determined that reception of the first content signal through the first port is not normal, in step 440, the display apparatus receives the second content signal through the second port. Here, the second content signal may have the same content as the first content signal.

In step 450, the display apparatus processes the received second content signal, and outputs the second content signal through the first port.

On the other hand, when it is determined that the reception of the first content signal through the first port is normal, the display apparatus receives, processes, and outputs the first content signal as it is.

As described above, if the display apparatus determines that the reception of the first content signal is abnormal while receiving the first content signal from the first content source through the first port and outputting the first content signal through the second port, the display apparatus switches the roles of the first and second ports. The display apparatus receives the second content signal from the second content source through the second port and the second content signal through the first port, so all of the plurality of display apparatuses may normally receive the content signal.

Hereinafter, a structure in which the role of each port is switched in the signal input/output interface of the display apparatus will be described.

Figure 5:
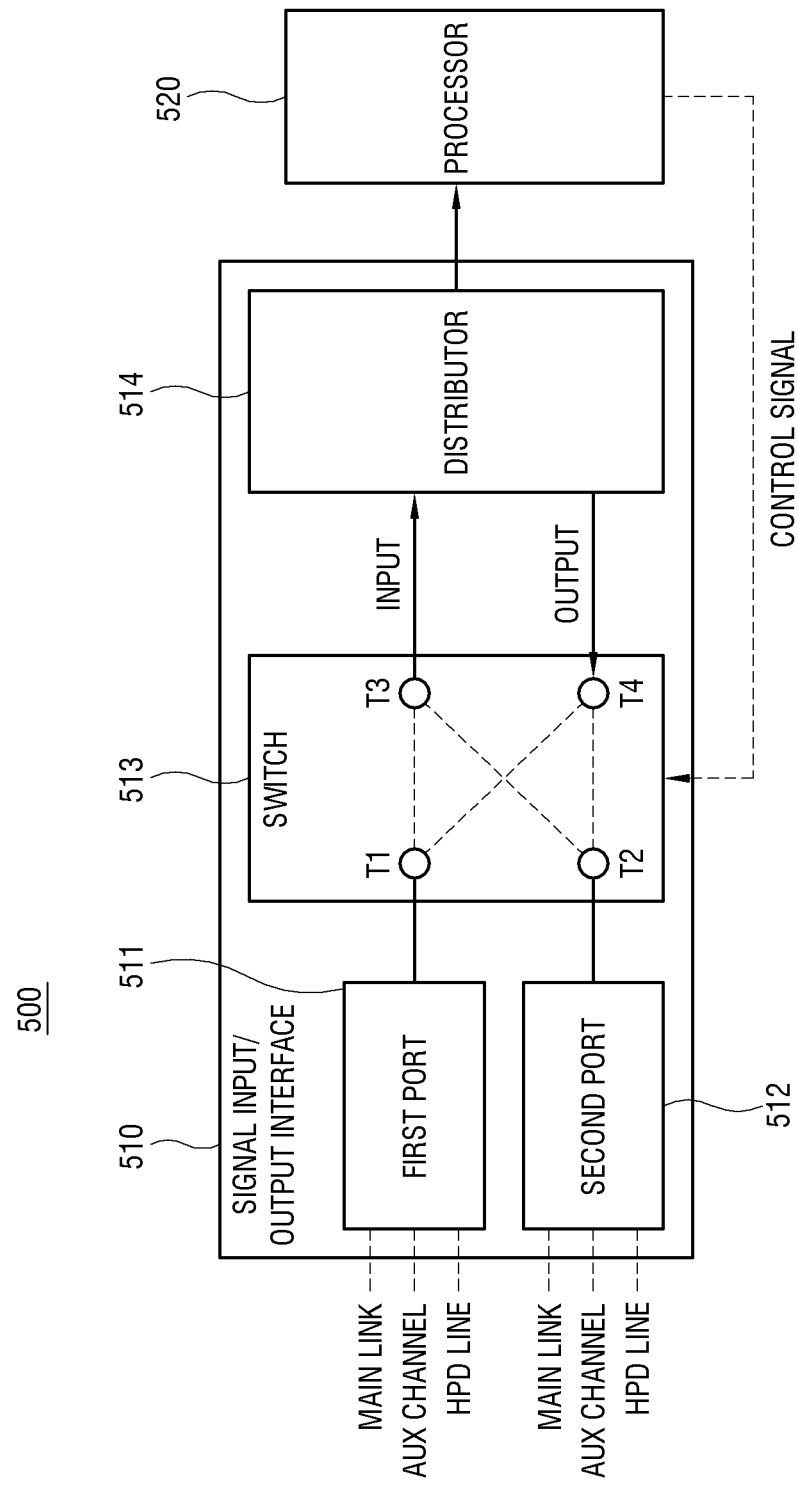
FIG. 5 is a configuration block diagram illustrating a switching structure of a signal input/output interface in the display apparatus according to the embodiment of the disclosure.

FIG. 5 is a configuration block diagram illustrating a switching structure of a signal input/output interface in the display apparatus according to the embodiment of the disclosure.

As illustrated in FIG. 5, a display apparatus 500 includes a signal input/output interface 510 that is provided to receive and output a content signal and a processor 520 that processes the content signal received by the signal input/output interface 510 to be displayed as an image. The signal input/output interface 510 includes a first port 511 and a second port 512 that are provided to input/output signals, a switch 513 that is connected to the first port 511 and the second port 512 and switched by the processor 520, and a distributor 514 that is connected to the switch 513 and branches the input content signal, and outputs the branched content signals to the processor 520 and the switch 513.

The first port 511 and the second port 512 are connected to other display apparatuses or content sources through a cable based on the DP standard. For example, in the case of the display apparatus 500 with the first loop-out connection order, the first port 511 is connected to a first content source that outputs a first content signal, and the second port 512 is a second display apparatus. In the case of the display apparatus 500 with the last loop-out connection order, the first port 511 is connected to the display apparatus with a loop-out connection order one earlier than the last loop-out connection order, and the second port 512 is connected to a second content source that outputs a second content signal. In the case of the n-th display apparatus 500 without first or last loop-out connection order, the first port 511 is connected to a (n−1)-th display apparatus, and the second port 512 is a (n+1)-th display apparatus.

The first port 511 and the second port 512 each include a plurality of terminals classified into a main link, an AUX channel, and an HPD line according to the DP standard. The first port 511 and the second port 512 basically have the same structure, and the executed roles be interchanged according to circumstances. The first port 511 may receive the first content signal from the first content source or other display apparatuses, or may output the second content signal transmitted from the switch 513. The second port 512 may output the first content signal transmitted from the switch 513, or receive the second content signal from the second content source or other display apparatuses. The second port 512 outputs the first content signal while the first port 511 receives the first content signal, and the first port 511 outputs the second content signal while the second port 512 receives the second content signal.

The first port 511 includes a main link, an AUX channel, and an HPD line according to the DP standard. The basic roles of each channel are as described above. When other display apparatuses are connected to the first port 511 through a DP cable, the display apparatus 500 informs that the other display apparatus is connected to the display apparatus 500 by transmitting an HPD signal to the other display apparatus through the HPD line. The other display apparatus performs an operation of transmitting confirmation data for communication with the display apparatus 500 through the AUX channel and receiving reply data corresponding to the confirmation data from the display apparatus 500, and this operation is referred to as link training. When the link training succeeds, the other display apparatus outputs the content signal through the main link, and the display apparatus 500 receives the content signal through the first port 511.

The second port 512 also includes the main link, the AUX channel, and the HPD line according to the DP standard.

The switch 513 is interposed between the first port 511 and the distributor 514, and between the second port 512 and the distributor 514. The switch 513 is switched between the first state and the second state according to the control signal applied from the processor 520. In the first state, the switch 513 connects the first port 511 to the input terminal of the distributor 514 and connects the second port 512 to the output terminal of the distributor 514. On the other hand, in the second state, the switch 513 connects the first port 511 to an output terminal of the distributor 514 and connects the second port 512 to an input terminal of the distributor 514.

To this end, the switch 513 has the following four terminals: T1 connected to the first port 511, T2 connected to the second port 512, T3 connected to the input terminal of the distributor 514, and T4 connected to the output terminal of the distributor 514. The switch 513 is switched between the first state in which the T1 and T3 are connected and the T2 and T4 are connected and the second state in which the T1 and T4 are connected and the T2 and T3 are connected, according to the control signal applied from the processor 520.

The control signal applied to the switch 513 may be implemented as various types of signals, such as a signal of a preset voltage and a logic signal representing any one of high/low. For example, the switch 513 is in the first state while a low level signal is applied to a control signal input terminal of the switch 513, whereas the switch 513 may be switched to the second state while a high level signal is applied to the control signal input terminal of the switch 513.

Alternatively, the switch 513 is in the first state while no control signal is applied to the switch 513, whereas the switch 513 may be designed to switch to the second state while the control signal is applied to the switch 513.

The distributor 514 separates or copies the input content signal into two identical signals, and outputs the two signals, respectively. That is, the distributor 514 copies the content signals input from the switch 513 into two, and outputs each of the copied content signals to the processor 520 and the switch 513.

Hereinafter, a structure in which signals are transmitted while the switch 513 is in the first state will be described.

Figure 6:
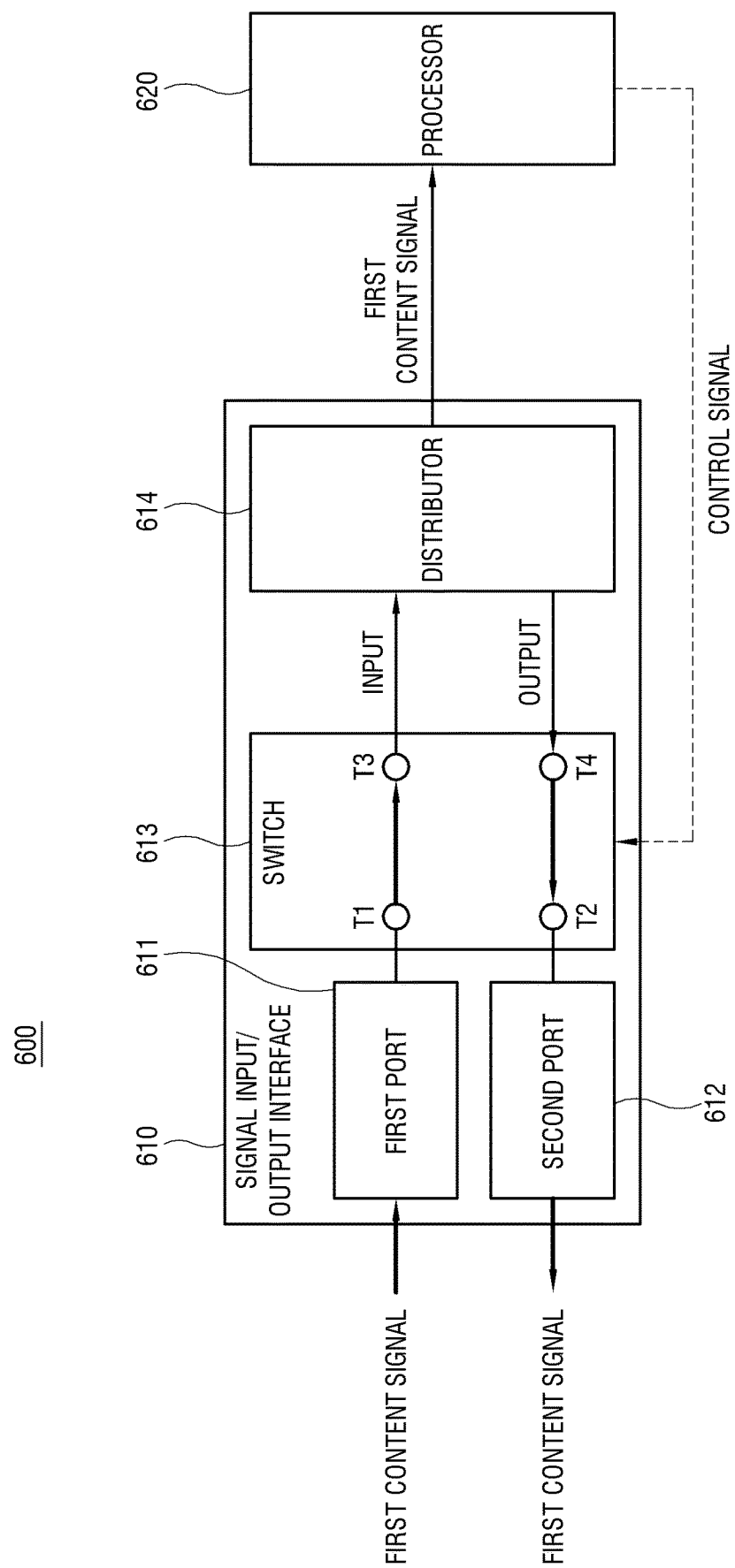
FIG. 6 is a configuration block diagram illustrating a signal transmission structure when a switch is in a first state in the signal input/output interface of the display apparatus of FIG. 5.

FIG. 6 is a configuration block diagram illustrating a signal transmission structure when the switch is in the second state in the signal input/output interface of the display apparatus of FIG. 5.

As illustrated in FIG. 6, a display apparatus 600 includes a signal input/output interface 610 and a processor 620, in which the signal input/output interface 610 includes a first port 611, a second port 612, a switch 613, and a distributor 614. This structure is as described in the above-described embodiment.

When the first content signal is received through the first port 611 and processed, the processor 620 switches the switch 613 to the preset first state. Among the plurality of terminals, T1 in the switch 613 in the first state is connected to T3, and T2 in the switch 613 is connected to T4. That is, the T1 and T4 are disconnected, and the T2 and T3 are disconnected.

When the first content signal is received through the first port 611 while the switch 613 is in the first state, the first content signal is transmitted from the first port 611 to the switch 613. The first content signal is input to an input terminal of the distributor 614 through the T1 and T3 in the switch 613. The distributor 614 branches the first content signal input to the input terminal, outputs the branched first content signal through the output terminal of the distributor 614, and also outputs the branched first content signal to the processor 620. The processor 620 processes the received first content signal to display an image.

The first content signal output from the distributor 614 is transmitted to the switch 613. The first content signal is transmitted to the second port 612 through the T4 and T2 in the switch 613. Thereby, the first content signal is output through the second port 612.

Hereinafter, a description will be given of the content signal transmission type when each display apparatus constituting the loop-out performs such an operation.

Figure 7:
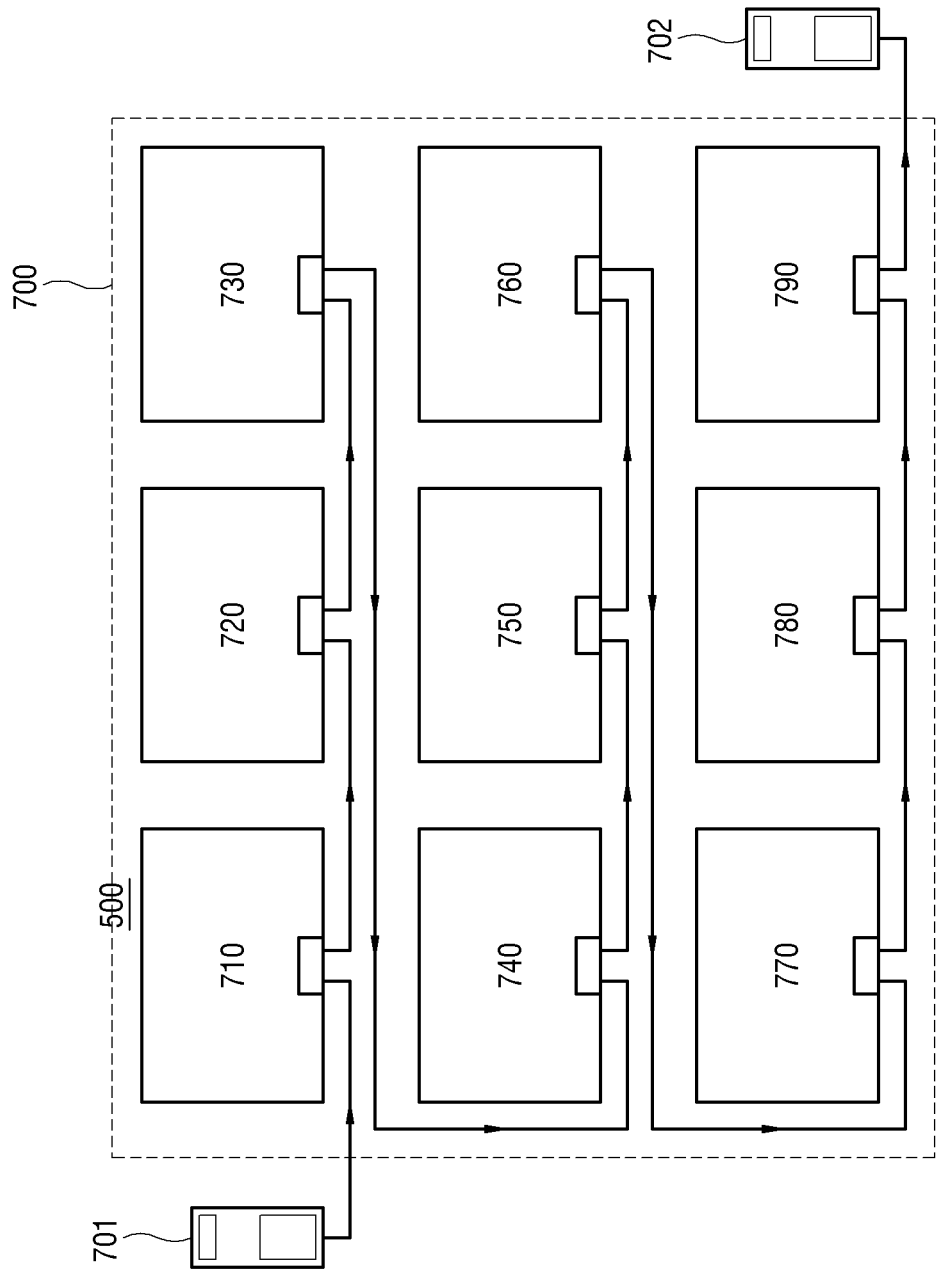
FIG. 7 is an exemplary diagram illustrating a form in which each display apparatus receives a first content signal from a first content source in the system according to the embodiment of the disclosure.

FIG. 7 is an exemplary diagram illustrating a form in which each display apparatus receives a first content signal from a first content source in the system according to the embodiment of the disclosure.

As illustrated in FIG. 7, the system includes a plurality of display apparatuses 700, and in this embodiment, for example, the system includes nine display apparatuses 710, 720, 730, 740, 750, 760, 770, 780, and 790. These display apparatuses 710, 720, 730, 740, 750, 760, 770, 780, and 790 may be distinguished according to a loop-out connection order.

Since the first display apparatus 710 with the first loop-out order is directly connected to the first content source 701, the first content signal output from the first content source 701 is received by the first display apparatus 710. The first content signal is processed in the first display apparatus 710 and displayed as an image, while the first content signal is output from the first display apparatus 710 and transmitted to the second display apparatus 720.

In this way, the first content signal is transmitted to each display apparatus 700, and is finally received by the ninth display apparatus 790. The ninth display apparatus 790 processes the first content signal received from the eighth display apparatus 780. Here, the ninth display apparatus 790 may or may not output the first content signal in the same manner as the other display apparatus 700.

When the first content signal is output from the ninth display apparatus 790, the first content signal is input to the second content source 702. The second content source 702 does not perform a special operation on the first content signal, such as processing the input first content signal or transmitting the processed first content signal to other apparatuses.

Alternatively, the ninth display apparatus 790 may not output the first content signal, and in this case, the ninth display apparatus 790 may receive the second content signal from the second content source 702. That is, the ninth display apparatus 790 receives the first content signal through the first port, receives the second content signal through the second port, processes the first content signal, and does not process the second content signal while processing the first content signal and displaying the processed first content signal as an image.

In this way, the plurality of display apparatuses 700 may receive and process the first content signal output from the first content source 701.

However, disconnection or transmission failure may occur at any one point in the loop-out connection path. As the causes of the disconnection or transmission failure, there are various factors such as a bad cable, a bad contact with a connection terminal, and a bad circuit wiring. For example, it is assumed that there is a case in which it is difficult to transmit the first content signal due to the disconnection between the third display apparatus 730 and the fourth display apparatus 740. In this case, the first content signal is normally received in the first display apparatus 710, the second display apparatus 720, and the third display apparatus 730, but the remaining display apparatuses 740, 750, 760, 770, 780, and 790 are difficult to normally receive the first content signal.

Accordingly, the remaining display apparatuses 740, 750, 760, 770, 780, and 790 may cope with the disconnection of the first content signal by receiving the second content signal output from the second content source 702. A detailed description thereof will be provided below.

Here, a method of determining, by remaining display apparatuses 740, 750, 760, 770, 780, and 790, that the first content signal is not normally received may vary according to the supported transmission standard. Hereinafter, when each display apparatus 740, 750, 760, 770, 780, and 790 supports a DP standard, a method of determining whether the first content signal is normally received will be described.

Figure 8:
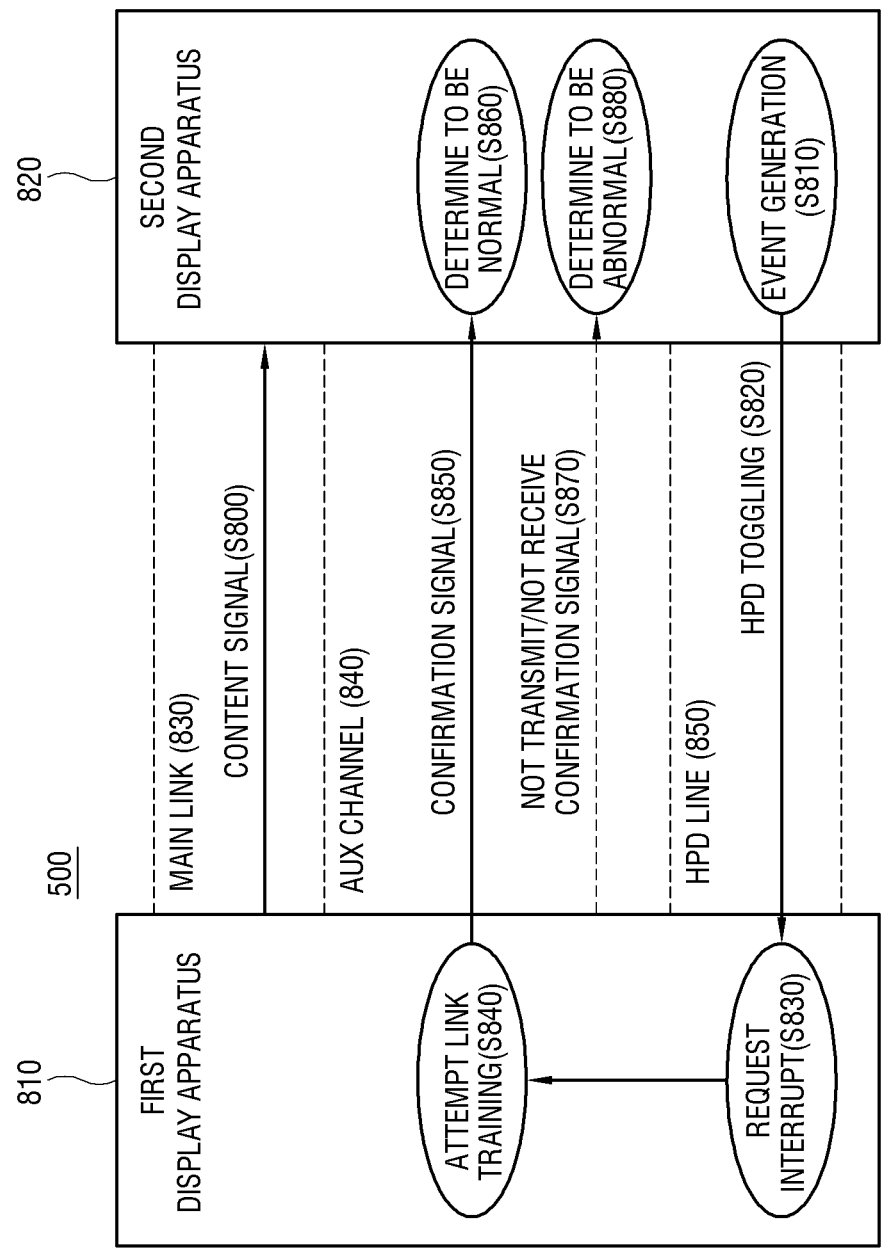
FIG. 8 is an exemplary diagram illustrating a method of determining whether a content signal is normally received from a first display apparatus when a second display apparatus according to the embodiment of the disclosure supports a DP standard.

FIG. 8 is an exemplary diagram illustrating a method of determining whether the content signal is normally received from the first display apparatus when the second display apparatus according to the embodiment of the disclosure supports a DP standard.

As illustrated in FIG. 8, a first display apparatus 810 and a second display apparatus 820 are communicatively connected to each other to transmit and receive a signal based on the DP standard. The first display apparatus 810 operates as a source device that outputs a content signal, and the second display apparatus 820 operates as a sync device that receives a content signal.

The first display apparatus 810 and the second display apparatus 820 are interconnected through a main link 830, an AUX channel 840, and an HDP line 850.

When the first display apparatus 810 and the second display apparatus 820 are interconnected, the second display apparatus 820 transmits the HPD signal to the first display apparatus 810 through the HPD line 850. The first display apparatus 810 transmits a confirmation signal for link connection to the second display apparatus 820 through the AUX channel 840 in response to the received HPD signal. The second display apparatus 820 transmits a response signal in response to the received confirmation signal to the first display apparatus 810 through the AUX channel 840. When the response signal is received, the first display apparatus 810 determines that the link connection between the first display apparatus 810 and the second display apparatus 820 has been completed. This process is referred to as the link training. Here, the confirmation signal and the response signal may include information previously promised to be recognized by the first display apparatus 810 and the second display apparatus 820, and the content of the information is not limited.

When the link training is completed, the first display apparatus 810 transmits a content signal through the main link 830. The second display apparatus 820 processes the received content signal to display an image (S800).

However, when a preset event occurs (S810), the second display apparatus 820 toggles the HPD line 850 (S820). Here, various preset events are possible. That is, various events with likelihood of abnormal situations such as detecting a packet error in the content signal received through the main link 830, not receiving a content signal for a predetermined time, or detecting an error at the time of processing the received content signal are possible. Alternatively, the event may be provided to occur periodically regardless of whether the error is detected.

According to the toggling of the HPD line 850, an interrupt request occurs in the first display apparatus 810 (S830). When the interrupt request occurs, the first display apparatus 810 attempts the link training through the AUX channel 840 (S840). As the first display apparatus 810 attempts link training, the first display apparatus 810 transmits the confirmation signal for the link connection to the second display apparatus 820 through the AUX channel 840.

When the confirmation signal is normally received through the AUX channel 840, the second display apparatus 820 determines that the link connection to the first display apparatus 810 is normal and the content signal is normally received from the first display apparatus 810 (S860).

On the other hand, several situations where the second display apparatus 820 does not normally receive the confirmation signal through the AUX channel 840 are possible (S870). For example, when the second display apparatus 820 does not receive the confirmation signal even though the first display apparatus 810 normally transmits the confirmation signal for the link training, since the HPD toggling and the interrupt request occur normally but the attempt of the link training itself has not been performed, when the first display apparatus 810 does not transmit the confirmation signal, there may be a case where the HPD toggling is performed but the interrupt request does not occur in the first display apparatus 810. The second display apparatus 820 may determine that the link connection to the first display apparatus 810 is abnormal, and may determine that it is difficult to normally receive the content signal from the first display apparatus 810 (S880).

The above embodiment relates to a case where the second display apparatus 820 is linked to the first display apparatus 810 based on the DP standard. If the HDMI standard is employed instead of the DP standard, the method of determining whether the link connection is abnormal is different.

For comparison, an example in which the source device and the sink device are linked to each other based on the HDMI standard will be given. The HDMI includes a data lane for transmitting a content signal and a display data channel (DDC) of two-way communication for exchanging control information. The source device transmits a clock signal together when transmitting a content signal to the sink device through a data lane. The sink device processes the content signal received through a data lane according to a timing at which the received clock signal appears. The sink device monitors the clock signal received through a plurality of data lanes, and may determine that the link connection to the source device is abnormal when the clock signal is not normally received.

On the other hand, the case in which the source device and the sink device are linked to each other based on the DP standard as in the embodiment of the disclosure is different from the case of HDMI. As described above, the DP includes a main link for transmitting a content signal and an AUX channel for exchanging control information. The source device does not transmit the clock signal to the sink device through the main link, but instead uses framing symbols. Unlike the HDMI, the DP converts a content signal into a data packet and transmits the data packet. The framing symbol includes a blank start (BS) that is arranged in a first packet of unit data and indicates a start of the unit data, and a blank end (BE) that is arranged in a last packet of unit data and indicates an end of the unit data. The sink device processes the content signal received through the main link according to the framing symbol.

That is, in the case of the DP standard, since the sink device does not receive the clock signal, it is difficult to determine whether the link connection is abnormal using the clock signal as in the case of the HDMI standard. Accordingly, the sink device according to the embodiment of the disclosure may determine whether the link connection to the source device is abnormal according to the above-described method.

In the previous embodiment, the structure in which the signal is transmitted while the switch in the signal input/output interface of the display apparatus is in the first state has been described. Hereinafter, as the display apparatus determines that the link connection to the front-stage display apparatus is abnormal, a structure in which the switch is switched to the second state and a signal is transmitted from the switch in the second state will be described.

Figure 9:
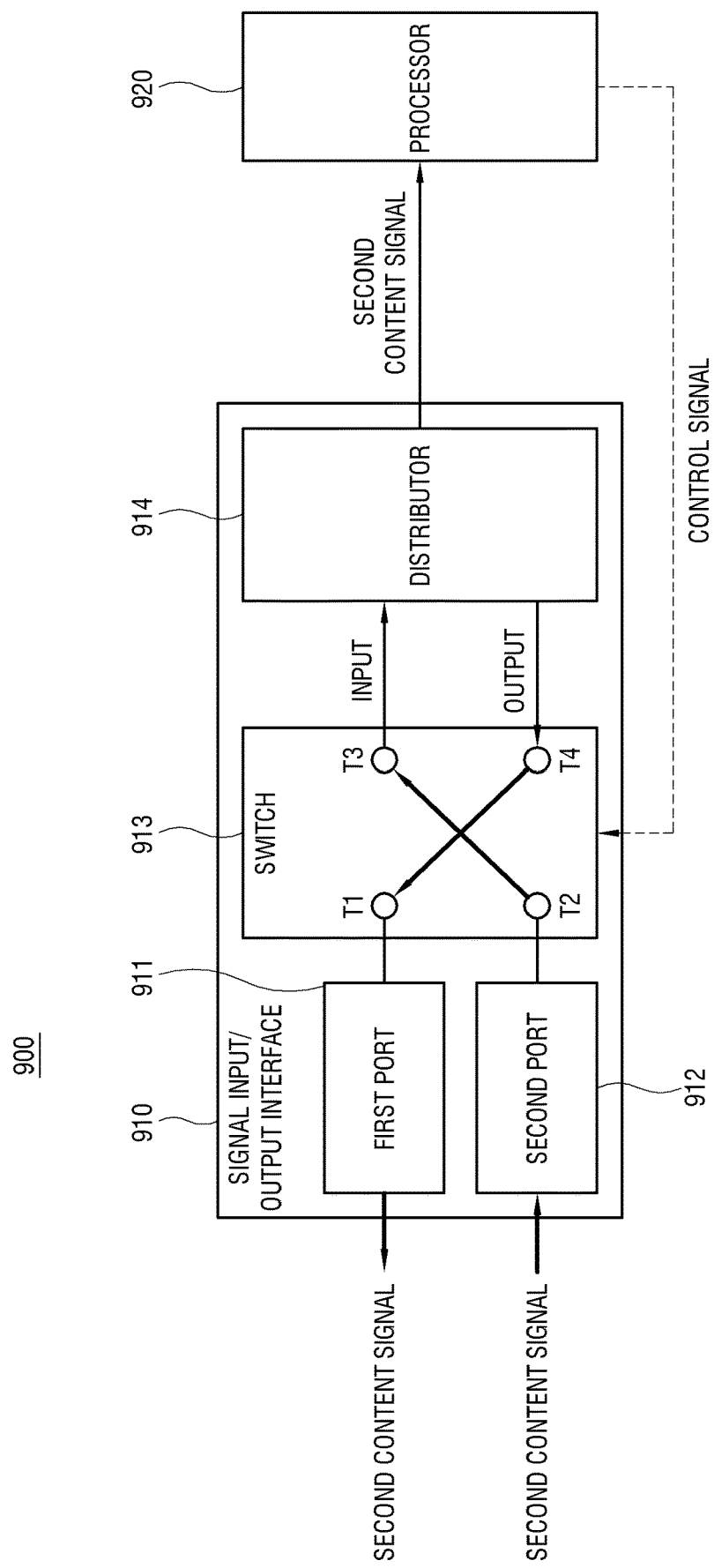
FIG. 9 is a configuration block diagram illustrating a signal transmission structure when the switch is in a second state in the signal input/output interface of the display apparatus of FIG. 5.

FIG. 9 is a configuration block diagram illustrating a signal transmission structure when the switch is in a second state in the signal input/output interface of the display apparatus of FIG. 5.

As illustrated in FIG. 9, a display apparatus 900 includes a signal input/output interface 910 and a processor 920, in which the signal input/output interface 910 includes a first port 911, a second port 912, a switch 913, and a distributor 914. This structure is as described in the above-described embodiment.

When the processor 920 determines that the first content signal is not normally received through the first port 911, the processor 920 operates as follows. The processor 920 switches the switch 913 to be a preset second state. Among the plurality of terminals, T1 in the switch 913 in the first state is connected to T3, and T2 in the switch 913 is connected to T4. That is, the T1 and T3 are disconnected, and the T2 and T4 are disconnected.

When the second content signal is received through the second port 912 while the switch 913 is in the second state, the second content signal is transmitted from the second port 912 to the switch 913. The second content signal is input to an input terminal of the distributor 914 through the T2 and T3 in the switch 913. The distributor 914 branches the second content signal input to the input terminal, outputs the branched second content signal through the output terminal of the distributor 914, and also outputs the branched second content signal to the processor 920. The processor 920 processes the received second content signal to display an image.

The second content signal output from the distributor 914 is transmitted to the switch 913. The second content signal is transmitted to the first port 911 through the T4 and T1 in the switch 913. Thereby, the second content signal is output through the first port 911.

Hereinafter, a description will be given of the content signal transmission type when each display apparatus constituting the loop-out performs such an operation.

Figure 10:
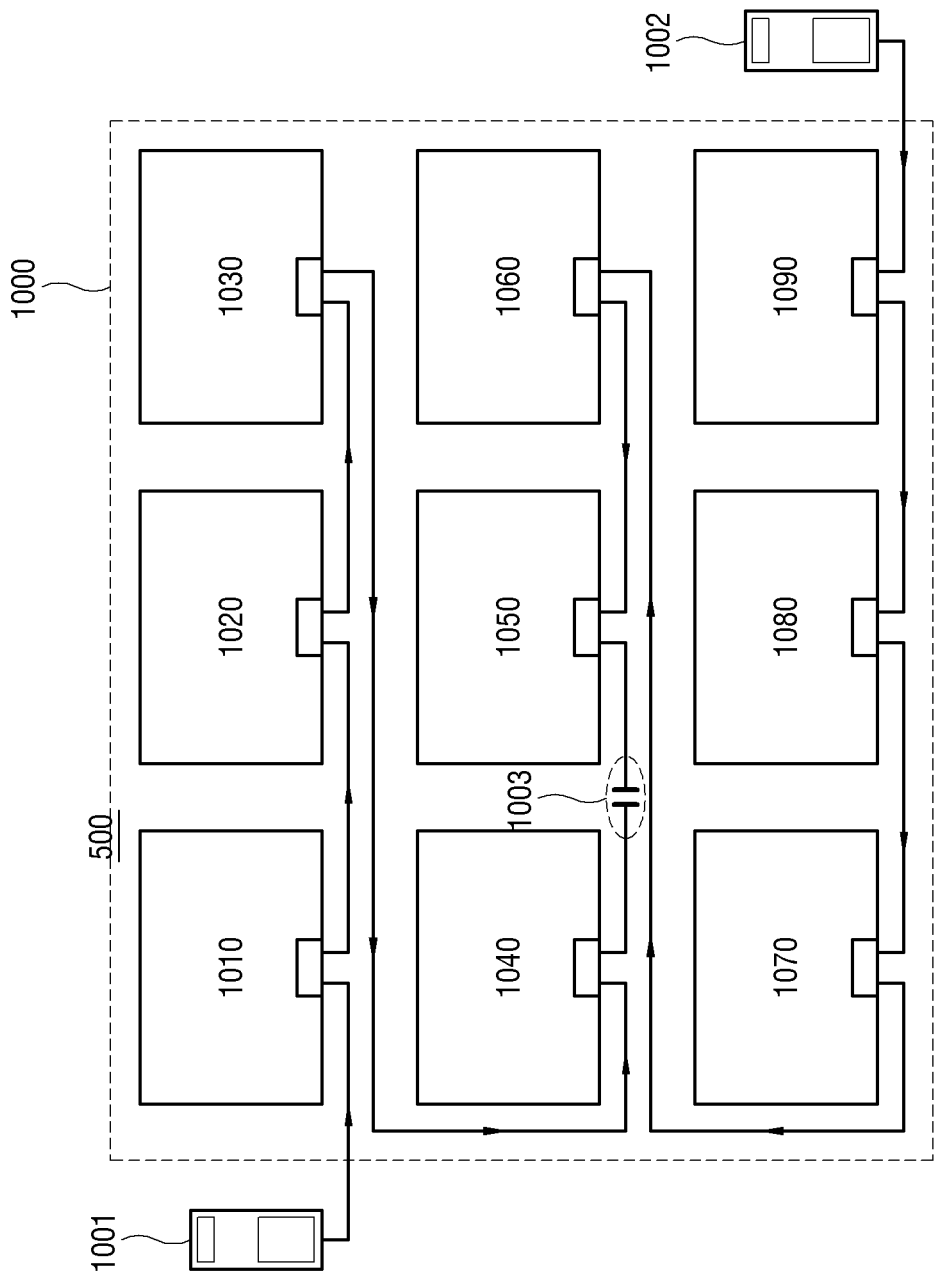
FIG. 10 is an exemplary diagram illustrating a form in which each display apparatus receives a second content signal from a second content source in the system according to the embodiment of the disclosure.

FIG. 10 is an exemplary diagram illustrating a form in which each display apparatus receives the second content signal from the second content source in the system according to the embodiment of the disclosure.

As illustrated in FIG. 10, the system includes a plurality of display apparatuses 1000, and in this embodiment, for example, the system includes nine display apparatuses 1010, 1020, 1030, 1040, 1050, 1060, 1070, 1080, and 1090. These display apparatuses 1010, 1020, 1030, 1040, 1050, 1060, 1070, 1080, and 1090 may be distinguished according to a loop-out connection order.

It is assumed that a defective connection occurs between the fourth display apparatus 1040 and the fifth display apparatus 1050 while the plurality of display apparatuses 1000 each receive the first content signal from the first content source 1001. In this case, the plurality of display apparatuses 1000 may be divided into the front-stage apparatuses 1010, 1020, 1030, and 1040 and the rear-stage display apparatuses 1050, 1060, 1070, 1080, and 1090 according to the loop-out order based on the defective connection point 1003 for convenience.

The front-stage display apparatuses 1010, 1020, 1030, and 1040 may normally receive the first content signal from the first content source 1001, as described in the previous embodiment. However, it is difficult for the rear-stage display apparatuses 1050, 1060, 1070, 1080, and 1090 to receive the first content signal from the first content source 1001 because of the defective connection point 1003. Accordingly, when it is determined that each rear-stage display apparatus 1050, 1060, 1070, 1080, and 1090 does not normally receive the first content signal, each display apparatus 1050, 1060, 1070, 1080, and 1090 switch the reception and output roles of the first and second ports, respectively, to receive the second content signal from the second content source 1002. Details of the determination and switching operations are as described in the previous embodiment.

For example, the ninth display apparatus 1090 with the last loop-out order receives the first content signal through the first port and outputs the first content signal through the second port while normally receiving the first content signal. Alternatively, the ninth display apparatus 1090 may receive and process the first content signal through the first port while normally receiving the first content signal, and may receive the second content signal from the second content source 1002 through the second port but may not process the second content signal.

However, when it is determined that the first content signal is not normally received through the first port, the ninth display apparatus 1090 receives and processes the second content signal from the second content source 1002 through the second port, and outputs the second content signal through the first port.

On the other hand, when the eighth display apparatus 1080 located in front of the ninth display apparatus 1090 determines that the first content signal is not normally received through the first port, the eighth display apparatus 1080 receives the second content signal through the second port, and outputs the second content signal through the first port. The seventh display apparatus 1070, the sixth display apparatus 1060, and the fifth display apparatus 1050 also receive the second content signal according to the same principle.

As a result, the front-stage display apparatuses 1010, 1020, 1030, and 1040 receive the first content signal from the first content source 1001 based on the defective connection point 1003, and the rear-stage display apparatuses 1050, 1060, 1070, 1080, and 1090 receive the second content signal from the second content source 1002. If the first content signal and the second content signal are the same content, there is no difference in terms of content before and after the defective connection occurs in the images displayed on all of the plurality of display apparatuses 1000.

Even if the defective connection occurs at any point under the loop-out connection structure, the system according to the present embodiment may cope with the above-described method. For example, when the defective connection point occurs between the first content source 1001 and the first display apparatus 1010, all of the display apparatuses 1000 may receive the second content signal.

In this way, the plurality of display apparatuses 1000 selectively select and process any one of the content signals from one of the first content source 1001 and the second content source 1002 for the defective connection occurring under the loop-out connection structure.

The switch structure of the signal input/output interface of each display apparatus described above may be implemented in various ways. Hereinafter, the switch structure to be described is only one implementation type, and the following embodiments do not limit the implementation method of the switch.

Figure 11:
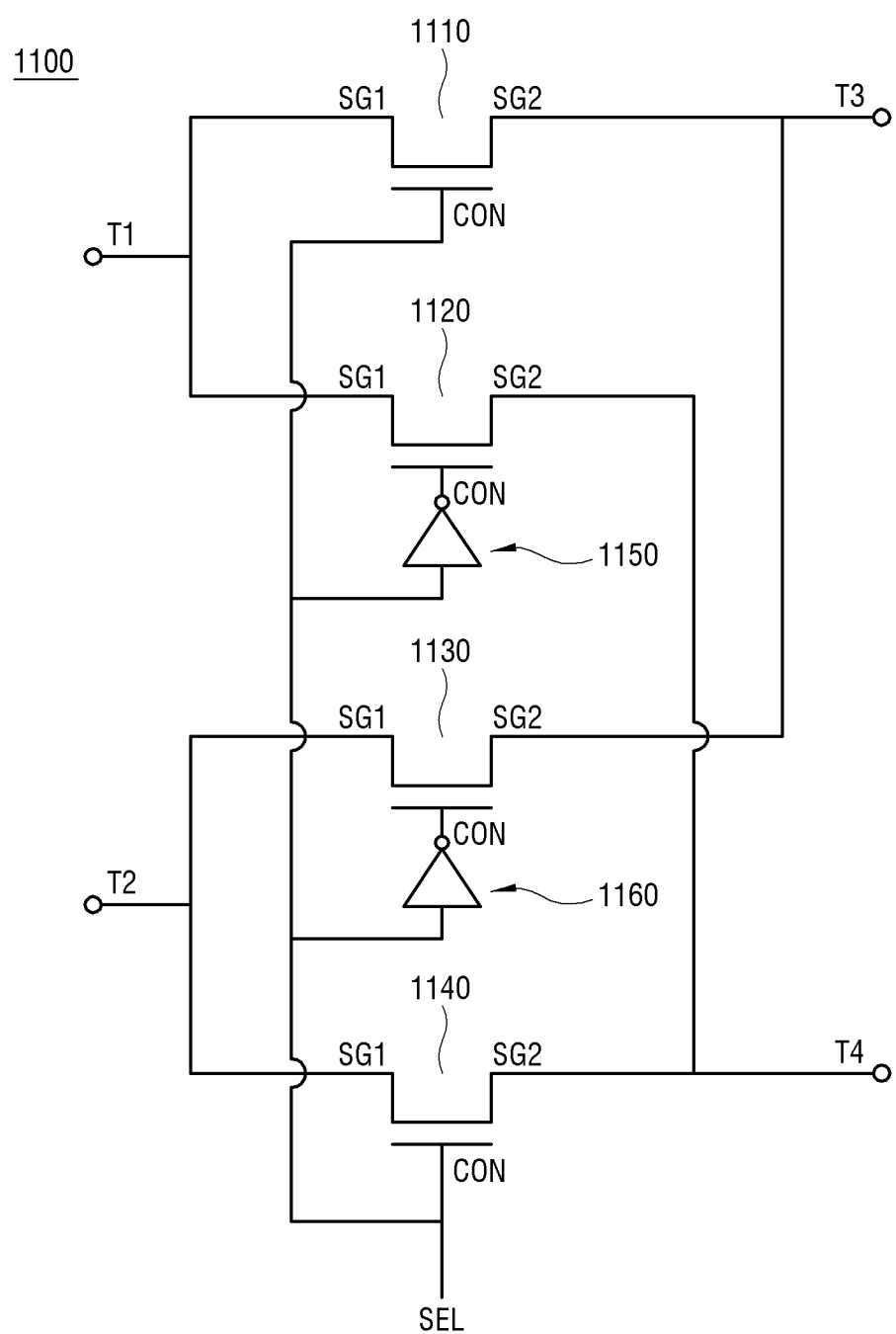
FIG. 11 is an exemplary diagram illustrating a circuit structure of the switch applied to the signal input/output interface of the display apparatus according to the embodiment of the disclosure.

FIG. 11 is an exemplary diagram illustrating a circuit structure of the switch applied to the signal input/output interface of the display apparatus according to the embodiment of the disclosure.

As illustrated in FIG. 11, the switch 1100 applied to the signal input/output interface of the display apparatus according to the present embodiment includes four terminals T1, T2, T3, and T4, a selection terminal SEL connected to the processor, a first switching circuit 1110 connected to the T1 and T3, a second switching circuit 1120 connected to the T1 and T4, a first inverter 115 connected to the second switching circuit 1120 and the SEL, and a second inverter 1160 connected to a third switching circuit 1130 and the SEL. The roles of the four terminals T1, T2, T3, and T4 have already been described in the previous embodiment.

By applying a control signal through the SEL, the processor connects T1 to any one of the T3 and T4 and connects T2 to any one of the T3 and T4.

Each of the switching circuits 1110, 1120, 1130, and 1140 includes a first signal terminal SG1 and a second signal terminal SG2 that form a signal path through which an electric signal is transmitted, and a control terminal CON that selectively permits or interrupts the signal path between the SG1 and SG2.

The first switching circuit 1110 permits or interrupts signal transmission between the T1 and T3 according to the control signal applied through the SEL. The SG1 of the first switching circuit 1110 is connected to the T1, the SG2 is connected to the T3, and the CON is connected to the SEL.

The second switching circuit 1120 permits or interrupts the signal transmission between the T1 and T4 according to the control signal applied through the SEL. The SG1 of the second switching circuit 1120 is connected to the T1, the SG2 is connected to the T3, and the CON is connected to the SEL through the inverter 1150.

The third switching circuit 1130 permits or interrupts signal transmission between the T2 and T3 according to the control signal applied through the SEL. The SG1 of the third switching circuit 1130 is connected to the T2, the SG2 is connected to the T3, and the CON is connected to the SEL through the second inverter 1160.

The fourth switching circuit 1140 permits or interrupts signal transmission between the T2 and T4 according to the control signal applied through the SEL. The SG1 of the fourth switching circuit 1140 is connected to the T2, the SG2 is connected to the T4, and the CON is connected to the SEL.

The first inverter 1150 inverts the control signal applied through the SEL. That is, the first inverter 1150 converts the applied control signal to a low level when the applied control signal is at a high level, and converts the control signal to a high level when the control signal is at a low level, and applies the control signal to the CON of the second switching circuit 1120.

The second inverter 1160 inverts the control signal applied through the SEL. That is, the second inverter 1160 converts the applied control signal to a low level when the applied control signal is at a high level, and converts the control signal to a high level when the control signal is at a low level, and applies the control signal to the CON of the third switching circuit 1130.

The plurality of switching circuits 1110, 1120, 1130, and 1140 may be implemented with a transistor such as a metal oxide semiconductor field effect transistor (MOSFET). In the case of using the inverters 1150 and 1160 for the switch 1100 as in this embodiment, the plurality of switching circuits 1110, 1120, 1130, and 1140 are unified as either an N-channel MOSFET or a P-channel MOSFET.

On the other hand, a MOSFET applied to a pair of the first switching circuit 1110 and the fourth switching circuit 1140, and a MOSFET applied to a pair of the second switching circuit 1120 and the third switching circuit 1130 are implemented in a type in which the MOSFETs are opposite to each other, the inverters 1150 and 1160 are omitted in the switch 1100. That is, when the first switching circuit 1110 and the fourth switching circuit 1140 are implemented as a P-channel MOSFET, and the second switching circuit 1120 and the third switching circuit 1130 are implemented as an N-channel MOSFET, the inverters 1150 and 1160 are omitted. Alternatively, even when the first switching circuit 1110 and the fourth switching circuit 1140 are implemented as an N-channel MOSFET, and the second switching circuit 1120 and the third switching circuit 1130 are implemented as a P-channel MOSFET, the inverters 1150 and 1160 are omitted.

Hereinafter, the operation when the switch 1100 is in the first state will be described.

Figure 12:
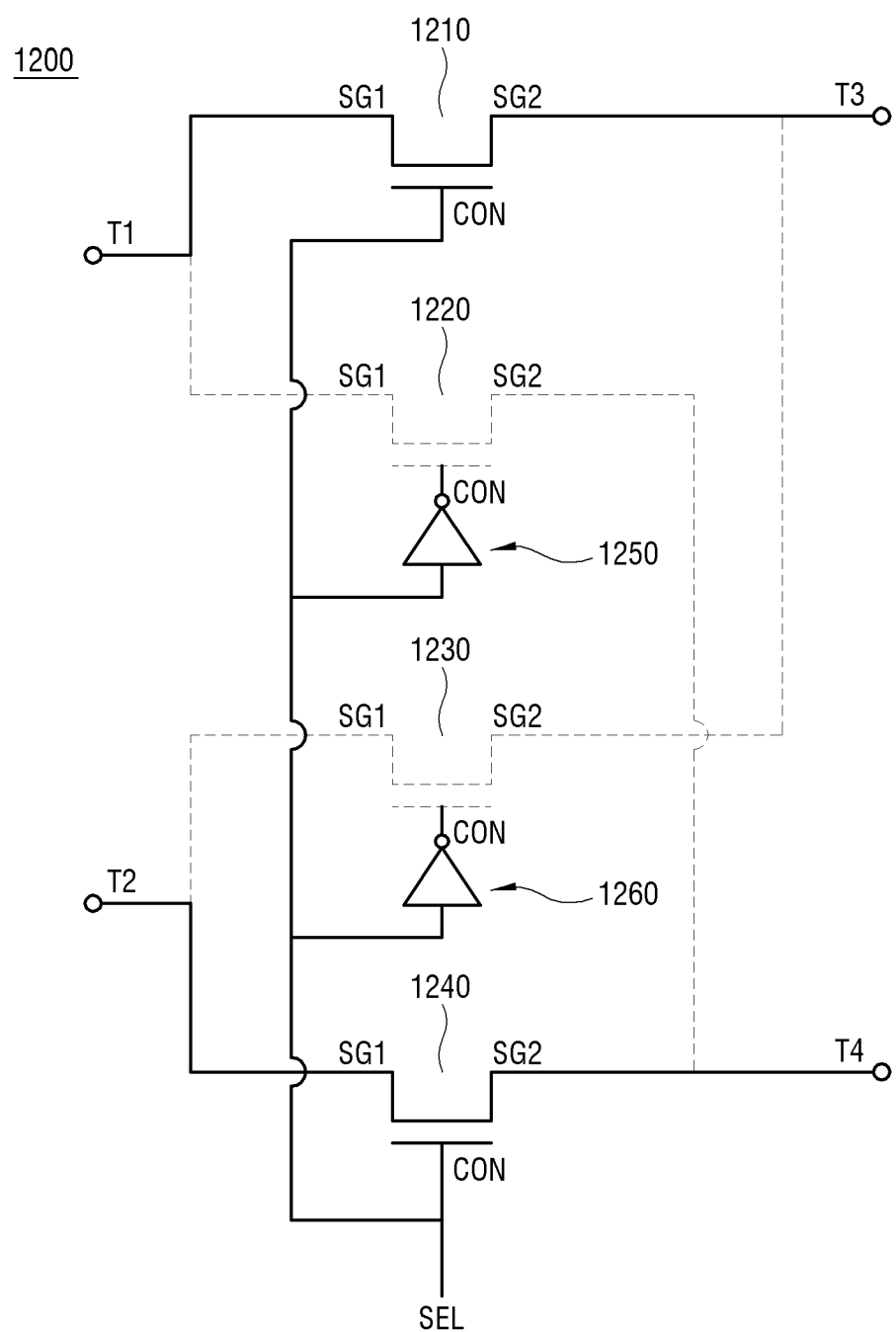
FIG. 12 is an exemplary diagram illustrating a signal transmission aspect when the switch of FIG. 11 is in the first state.

FIG. 12 is an exemplary diagram illustrating a signal transmission state when the switch of FIG. 11 is in the first state.

As illustrated in FIG. 12, when a control signal indicating a first state is applied to a SEL of a switch 1200, the control signal is applied to a first switching circuit 1210 provided between T1 and T3, and a fourth switching circuit 1240 provided between T2 and T4, respectively. According to the control signal, the first switching circuit 1210 and the fourth switching circuit 1240 are turned on, the T1 and T3 are electrically connected to each other, and the T2 and T4 are electrically connected to each other.

In addition, when the control signal is input to a first inverter 1250 and a second inverter 1260, the first inverter 1250 and the second inverter 1260 transmit a signal in which the input control signal is inverted to the second switching circuit 1220 provided between the T1 and T4 and the third switching circuit 1230 provided between the T2 and T3. According to the inverted signal, the second switching circuit 1220 and the third switching circuit 1230 are turned off, the T1 and T4 are electrically disconnected from each other, and the T2 and T3 are electrically disconnected from each other.

Hereinafter, the operation when the switch 1200 is in the second state will be described.

Figure 13:
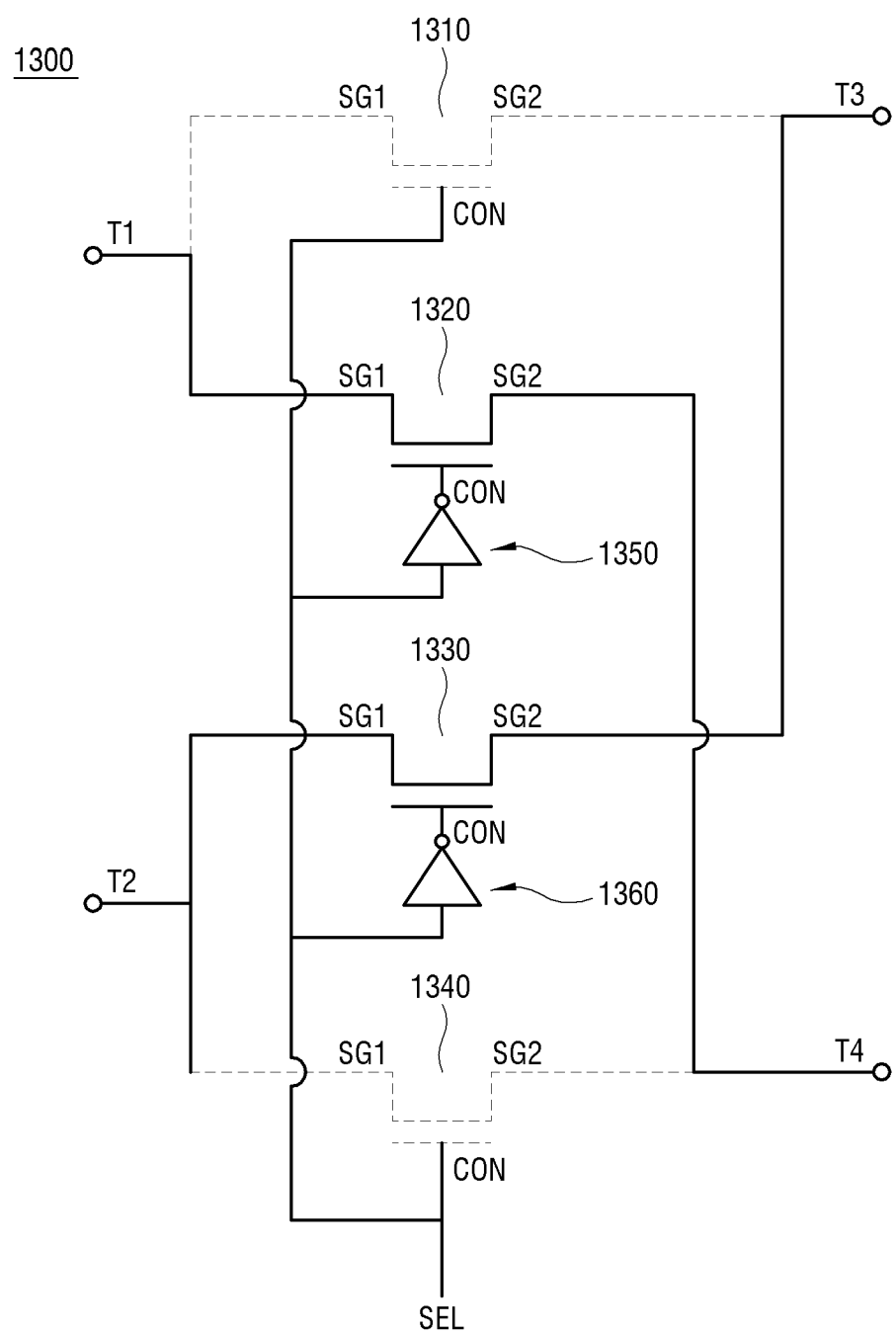
FIG. 13 is an exemplary diagram illustrating a signal transmission aspect when the switch of FIG. 11 is in the second state.

FIG. 13 is an exemplary diagram illustrating a signal transmission state when the switch of FIG. 11 is in the second state.

As illustrated in FIG. 13, when a control signal indicating a second state is applied to a SEL of a switch 1300, the control signal is applied to a first switching circuit 1310 provided between T1 and T3, and a fourth switching circuit 1340 provided between T2 and T4, respectively. According to the control signal, the first switching circuit 1310 and the fourth switching circuit 1340 are turned off, the T1 and T3 are electrically disconnected from each other, and the T2 and T4 are electrically disconnected from each other.

In addition, when the control signal is input to a first inverter 1350 and a second inverter 1360, the first inverter 1350 and the second inverter 1360 transmit a signal in which the input control signal is inverted to the second switching circuit 1320 provided between the T1 and T4 and the third switching circuit 1330 provided between the T2 and T3. According to the inverted signal, the second switching circuit 1320 and the third switching circuit 1330 are turned on, the T1 and T4 are electrically connected to each other, and the T2 and T3 are electrically connected from each other.

Hereinafter, a method of controlling a switch by the display apparatus according to the embodiment of the disclosure will be described.

Meanwhile, in the previous embodiment, when each display apparatus determines that the reception of the first content signal through the first port is abnormal, the configuration of receiving the second content signal through the second port has been described. However, the switching of the roles of the first port and the second port may be performed according to the user input, and such an embodiment will be described below.

Figure 14:
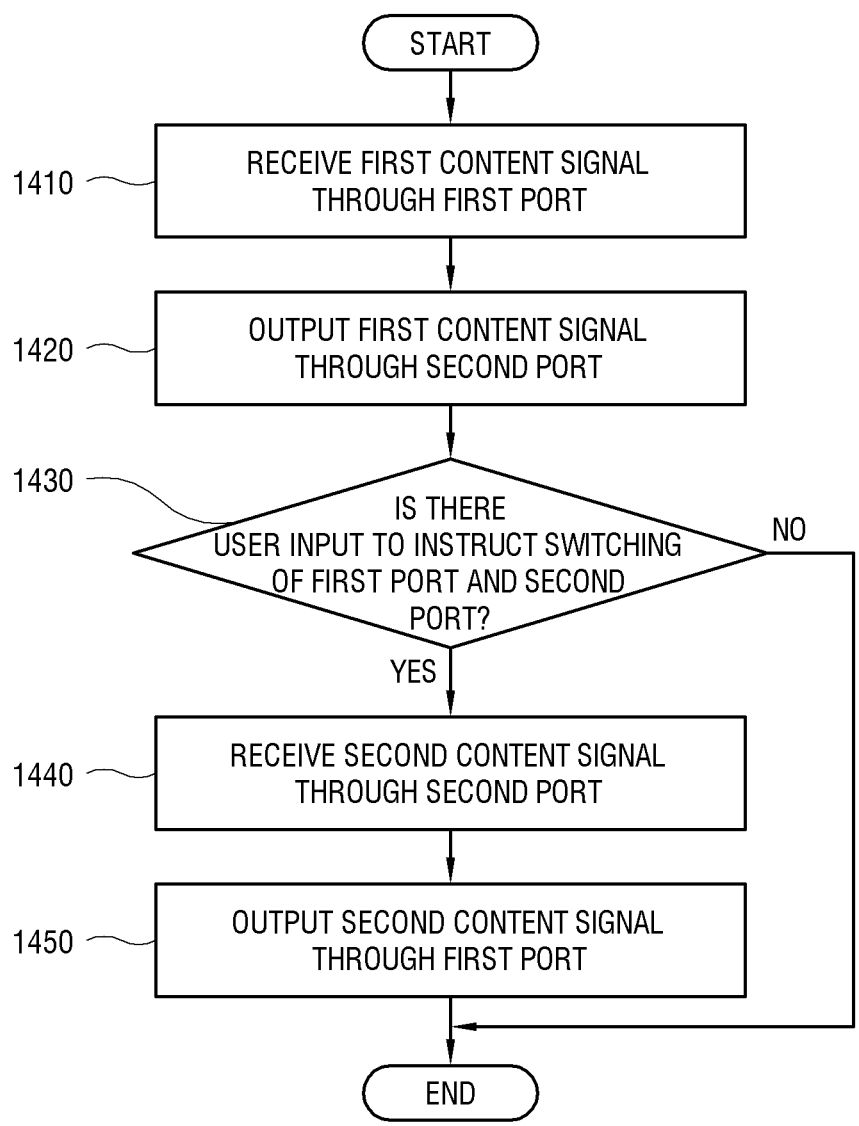
FIG. 14 is a flowchart illustrating a method of controlling a switch according to a user input by the display apparatus according to the embodiment of the disclosure.

FIG. 14 is a flowchart illustrating a method of controlling a switch according to a user input by the display apparatus according to the embodiment of the disclosure.

As illustrated in FIG. 14, the following operation is performed by the processor of the display apparatus.

In step 1410, the display apparatus receives the first content signal through the first port.

In step 1420, the display apparatus processes the received first content signal, and outputs the first content signal through the second port.

In step 1430, the display apparatus determines whether the user input instructing to switch the roles of the first port and the second port is received.

When it is determined that the user input has been received, in step 1440, the display apparatus receives the second content signal through the second port.

In step 1450, the display apparatus processes the received second content signal, and outputs the second content signal through the first port.

On the other hand, when it is determined that no user input has been received, the display apparatus receives, processes, and outputs the first content signal as it is.

In this way, the display apparatus may switch the roles of the first port and the second port according to the user input.

Meanwhile, in the previous embodiment, the case where the first content signal output from the first content source and the second content signal output from the second content source include the same content has been described. However, depending on the design method, the case where the first content signal and the second content signal are different from each other is possible, and in this case, the basic operation of the display apparatus is similar to the previous embodiment, but may include some different operations. Hereinafter, the embodiment will be described.

Figure 15:
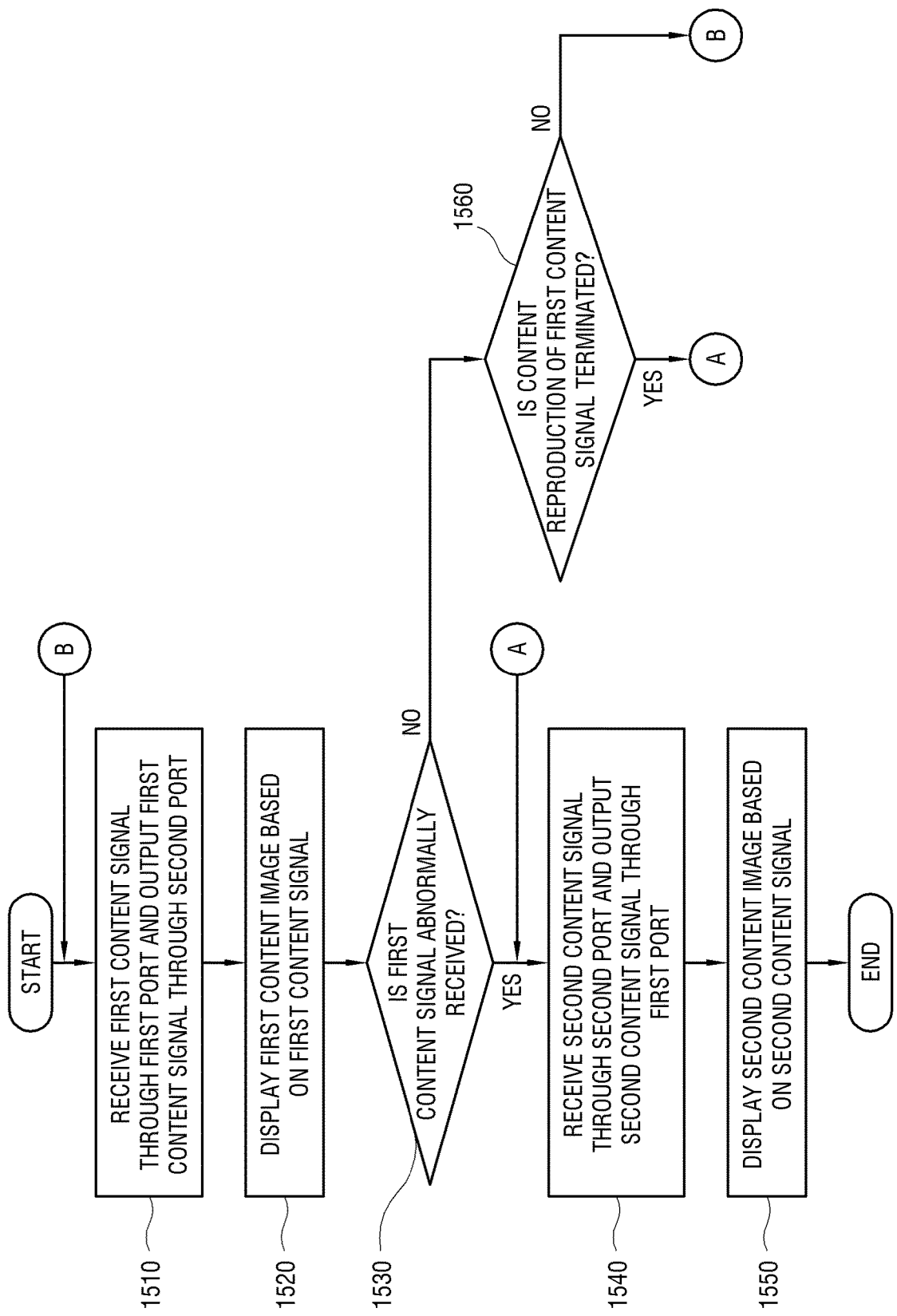
FIG. 15 is a flowchart illustrating a method of receiving and processing a first content signal and a second content signal by the display apparatus according to the embodiment of the disclosure.

FIG. 15 is a flowchart illustrating a method of receiving and processing a first content signal and a second content signal by the display apparatus according to the embodiment of the disclosure.

As illustrated in FIG. 15, the following operation is performed by the processor of the display apparatus.

In step 1510, the display apparatus receives the first content signal through the first port and outputs the first content signal through the second port.

In step 1520, the display apparatus displays a first content image based on the first content signal received through the first port.

In step 1530, the display apparatus determines whether the first content signal is abnormally received.

When it is determined that the first content signal is abnormally received, in step 1540, the display apparatus receives the second content signal through the second port and outputs the first content signal through the first port.

In step 1550, the display apparatus displays a second content image based on the second content signal received through the second port.

On the other hand, when it is determined that the first content signal is normally received, in step 1560, it is determined whether the content reproduction of the first content signal ends.

When it is determined that the content reproduction of the first content signal ends, the display apparatus proceeds to step 1540.

On the other hand, when it is determined that the content reproduction of the first content signal does not end, the display apparatus maintains the current state.

As a result, the display apparatus may receive and reproduce the second content signal in response to a case where the first content signal is abnormally received during reproduction or a case where the reproduction of the first content signal normally ends.

Meanwhile, the previous embodiment has described the case where two content sources are each provided, and the first content source outputs the first content signal to the display apparatus with the loop-out connection order, and the second content source outputs the second content signal to the display apparatus with the last loop-out connection order. However, depending on the design method, a configuration in which one content source outputs a content signal to each of the first display apparatus and the last display apparatus is possible, and such an embodiment will be described below.

Figure 16:
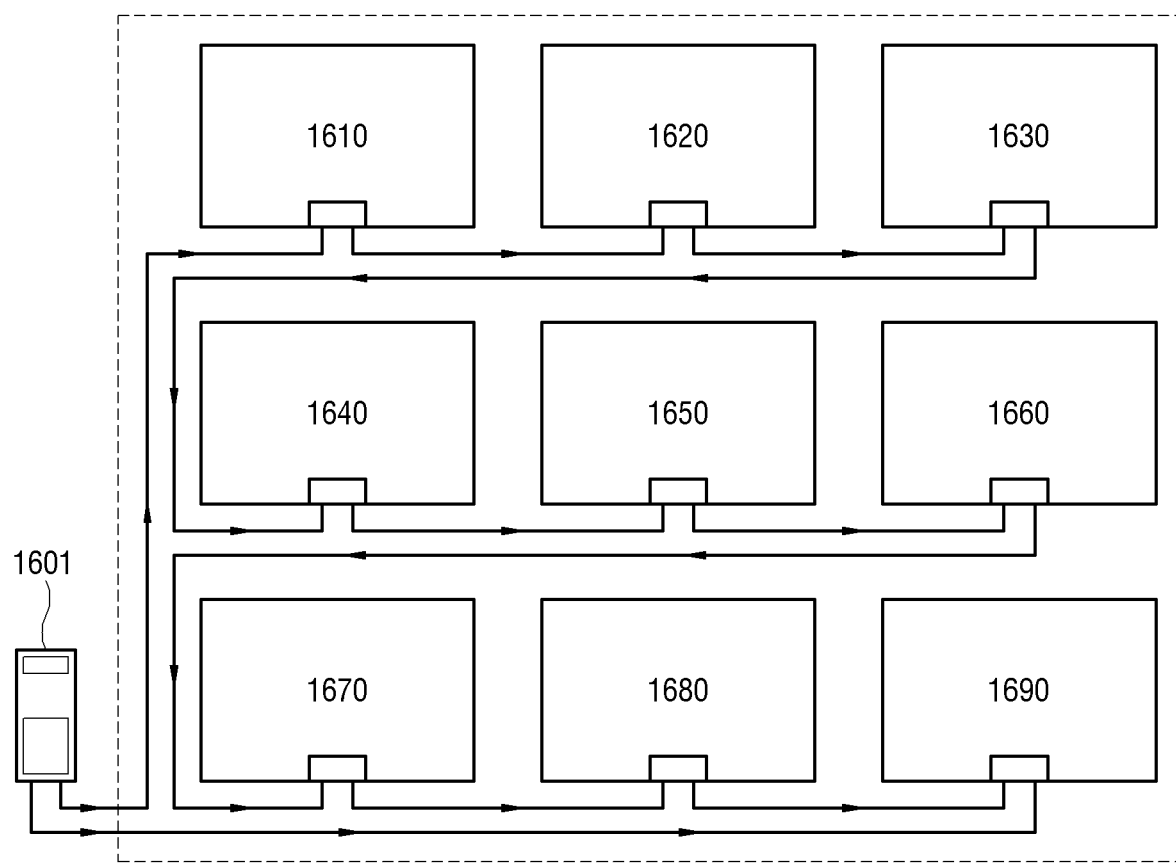
FIG. 16 is an exemplary diagram illustrating a method of providing a content signal from a content source in the system according to the embodiment of the disclosure.

FIG. 16 is an exemplary diagram illustrating a method of providing a content signal from a content source in the system according to the embodiment of the disclosure.

As illustrated in FIG. 16, the system according to the present embodiment includes a content source 1601 and a plurality of display apparatuses 1610, 1620, 1630, 1640, 1650, 1660, 1670, 1680, and 1690. The structure and operation of each display apparatus 1610, 1620, 1630, 1640, 1650, 1660, 1670, 1680, and 1690 are as described in the previous embodiment.

In the previous embodiment, the first content source is connected to the first display apparatus and the second content source is connected to the last display apparatus. In contrast, in the present embodiment, instead of providing only one content source 1601, the content source 1601 is connected to the first display apparatus 1610 with the first loop-out order and the ninth display apparatus 1690 having the last loop-out order, respectively, and output a content signal to the connected first display apparatus 1610 and ninth display apparatus 1690, respectively.

In the normal state, the first content signal output from the content source 1601 to the first display apparatus 1610 is transmitted to all the display apparatuses 1610, 1620, 1630, 1640, 1650, 1660, 1670, 1680, and 1690. In this case, the ninth display apparatus 1690 with the last loop-out order receives the first content signal from the eighth display apparatus 1680, and also receives the second content signal from the content source 1601. Among those, the first content signal may be used to display an image.

However, when the defective connection occurs in the loop-out connection, for example, when the defective connection occurs between the first display apparatus 1610 and the second display apparatus 1620, the remaining display apparatuses 1620, 1630, 1640, 1650, 1660, 1670, 1680, and 1690 except for the first display apparatus 1610 receives a second content signal that the ninth display apparatus 1690 receives from the content source 1601. As the method of receiving the second content signal, the previous embodiment can be applied, and therefore, a detailed description thereof will be omitted.

Accordingly, according to the present embodiment, even if a defective connection occurs in the loop-out connection structure between the display apparatuses 1610, 1620, 1630, 1640, 1650, 1660, 1670, 1680, and 1690, even one content source 1601 may cope with the defective connection.

Meanwhile, in the previous embodiments, a case where one or a plurality of content sources is directly connected to the display apparatus through a cable has been described. However, depending on the design method, the content source may be connected to the display apparatus through wide area network communication. That is, the plurality of display apparatuses constituting the loop-out are connected to each other by a cable, whereas the content source and the display apparatus may be connected to each other through a communication network such as the Internet.

The communication network may include both wired and wireless communication networks. The wired communication network includes the Internet such as a cable network or a telephone network, and the wireless communication network may include a wireless network using Wi-Fi, Bluetooth, and ZigBee. Furthermore, the wireless network may include mobile communication service networks such as CDMA, WCDMA, GSM, long term evolution (LET), and WiBro. Naturally, the communication network is not limited thereto, and may include a communication network of a communication service to be implemented in the future. For example, the wireless communication network may include an access point (AP) which may be connected to the Internet through a wired communication network provided by an Internet service provider. In addition, the access point may be replaced by a hub, a router, a gateway, or the like.

The operations of the apparatus as described in the above embodiments may be performed by artificial intelligence mounted in the apparatus. The artificial intelligence may be applied to various systems using machine learning algorithms. The artificial intelligence system is a computer system that implements intelligence corresponding to a human level or comparable to a human level, and is a system in which a machine, an apparatus, or a system autonomously performs learning and determination, and the recognition rate and determination accuracy are improved based on accumulation of use experience. The artificial intelligence technology includes machine learning (deep learning) technologies that use algorithms to classify/learn characteristics of input data, element technologies that simulate functions of recognition, determination, and the like of a human brain using machine learning algorithms, and the like.

Examples of the element technologies include at least one of linguistic understanding technology for recognizing human language/character, visual understanding technology for recognizing objects like human vision, reasoning/prediction technology for logically reasoning and predicting information by determining the information, knowledge expression technology for processing human experience information with knowledge data, or motion control technology for controlling autonomous driving of vehicles and movement of robots.

The linguistic understanding is a technology of recognizing and applying/processing human languages/characters, and includes natural language processing, machine translation, a dialog system, question and answer, speech recognition/synthesis, and the like.

The inference/prediction is a technology of deciding and logically predicting information, and includes knowledge/probability-based inference, optimization prediction, preference-based planning, recommendation, and the like.

The knowledge representation is a technology of automating and processing human experience information as knowledge data, and includes knowledge establishment (data generation/classification), knowledge management (data utilization), and the like.

Methods according to embodiments of the disclosure may be implemented in a form of program commands that may be executed through various computer means and may be recorded in a computer-readable recording medium. The computer-readable recording medium may include a program command, a data file, a data structure, or the like, alone or a combination thereof. For example, the computer-readable recording medium may be stored in a non-volatile storage such as a USB memory device, a memory such as a random access memory (RAM), a read only memory (ROM), a flash memory, a memory chip, or an integrated circuit, or a storage medium optically or magnetically readable by a machine (for example, a computer), such as a compact disk (CD), a digital versatile disk (DVD), a magnetic disk, a magnetic tape, or the like, regardless of whether data are erasable or rewritable. It may be appropriated that a memory that may be included in a mobile terminal is an example of a storage medium appropriate for storing a program or programs including instructions implementing embodiments of the disclosure and readable by a machine. The program instructions recorded in this storage medium may be specially designed and constructed for the disclosure or may be known and usable by those skilled in the art of computer software.

What is claimed is:

1. A display system, comprising:
a plurality of display apparatuses configured to be interconnected in series based on a DisplayPort standard and display an image based on an image signal from a first source device or a second source device,
wherein the display apparatus includes:
a display;
a signal input/output interface configured to be connected to a front-stage display apparatus and a rear-stage display apparatus, respectively; and
a processor configured to request the front-stage display apparatus to confirm whether a first image signal is normally transmitted during an operation for displaying an image based on the first image signal of the first source device received from the front-stage display apparatus,
control to display the image based on the first image signal received from the front-stage display apparatus on the display in response to receiving a confirmation signal confirming whether the first image signal is normally transmitted from the front-stage display apparatus, and
control the signal input/output interface to receive a second image signal of the second source device from the rear-stage display apparatus in response to not receiving the confirmation signal from the front-stage display apparatus.

2. The display system of claim 1, wherein the signal input/output interface includes a first port connected to the front-stage display apparatus and a second port connected to the rear-stage display apparatus, and
the processor controls to output the first image signal through the second port while the first image signal is received through the first port, and output the second image signal through the first port while the second image signal is received through the second port in response to not receiving the confirmation signal.

3. The display system of claim 1, wherein the first image signal and the second image signal include the same content.

4. The display system of claim 1, wherein the signal input/output interface includes a first port connected to the front-stage display apparatus and a second port connected to the rear-stage display apparatus, and
the first port includes a first channel that is provided to receive the first image signal and a second channel that is provided to receive the confirmation signal from the front-stage display apparatus and is different from the first channel.

5. The display system of claim 4, wherein the first port further includes a third channel that is different from the first channel and the second channel, and
the processor requests the front-stage display apparatus to confirm whether the first image signal is normally transmitted by generating an interrupt to the front-stage display apparatus through the third channel.

6. The display system of claim 4, wherein the processor requests the front-stage display apparatus to confirm whether the first image signal is normally transmitted when a preset error is detected in the reception operation of the first image signal through the first channel.

7. The display system of claim 6, wherein the processor determines that the preset error is detected when the first image signal is not received through the first channel for a preset time or a packet error is detected in the first image signal received through the first channel.

8. A control method of a display system including a plurality of display apparatuses that are interconnected in series based on a DisplayPort standard and display an image based on an image signal of a first source device or a second source device, the control method comprising:
controlling, by the display apparatus, to request a front-stage display apparatus to confirm whether a first image signal is normally transmitted during an operation for displaying an image based on the first image signal of the first source device received from the front-stage display apparatus;
controlling, by the display apparatus, to display the image based on the first image signal received from the front-stage display apparatus in response to receiving a confirmation signal confirming whether the first image signal is normally transmitted from the front-stage display apparatus; and
controlling, by the display apparatus, to receive a second image signal of the second source device from a rear-stage display apparatus in response to not receiving the confirmation signal from the front-stage display apparatus.

9. The control method of claim 8, wherein the display apparatus includes a first port connected to the front-stage display apparatus, and a second port connected to the rear-stage display apparatus, and
controls to output the first image signal through the second port while the first image signal is received through the first port, and output the second image signal through the first port while the second image signal is received through the second port in response to not receiving the confirmation signal.

10. The control method of claim 8, wherein the first image signal and the second image signal include the same content.

11. The control method of claim 8, wherein the display apparatus includes a first port connected to the front-stage display apparatus, and a second port connected to the rear-stage display apparatus, and
the first port includes a first channel that is provided to receive the first image signal and a second channel that is provided to receive the confirmation signal from the front-stage display apparatus and is different from the first channel.

12. The control method of claim 11, wherein the first port further includes a third channel that is different from the first channel and the second channel, and
an interrupt is generated to the front-stage display apparatus through the third channel to request the front-stage display apparatus to confirm whether the first image signal is normally transmitted.

13. The control method of claim 11, wherein the front-stage display apparatus is requested to confirm whether the first image signal is normally transmitted when a preset error is detected in the reception operation of the first image signal through the first channel.

14. The control method of claim 13, wherein it is determined that the preset error is detected when the first image signal is not received through the first channel for a preset time or a packet error is detected in the first image signal received through the first channel.

* * * * *